United States Patent
Nakane et al.

(10) Patent No.: US 8,555,451 B2
(45) Date of Patent: Oct. 15, 2013

(54) CLEANING DEVICE OF OPTICAL CONNECTOR

(75) Inventors: Junichi Nakane, Sakura (JP); Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 774 days.

(21) Appl. No.: 12/694,910

(22) Filed: Jan. 27, 2010

(65) Prior Publication Data

US 2011/0154599 A1 Jun. 30, 2011

(30) Foreign Application Priority Data

Dec. 25, 2009 (JP) ................................. 2009-295987

(51) Int. Cl.
*B08B 11/00* (2006.01)

(52) U.S. Cl.
USPC ..................................... 15/210.1; 15/104.001

(58) Field of Classification Search
USPC .......................................... 15/210.1, 104.001
See application file for complete search history.

(56) References Cited

U.S. PATENT DOCUMENTS

| | | | | |
|---|---|---|---|---|
| 6,758,605 | B1 * | 7/2004 | Villemaire et al. | 385/85 |
| 6,810,552 | B2 * | 11/2004 | Miyake et al. | 15/210.1 |

FOREIGN PATENT DOCUMENTS

| | | |
|---|---|---|
| JP | 2002-090576 A | 3/2002 |
| JP | 2003-279799 A | 10/2003 |
| JP | 2005-010726 A | 1/2005 |
| JP | 2006-201297 A | 8/2006 |

OTHER PUBLICATIONS

Japanese Office Action in corresponding Japanese Patent Application No. 2009-295987 issued Dec. 4, 2012.

* cited by examiner

*Primary Examiner* — Randall Chin
(74) *Attorney, Agent, or Firm* — Sughrue Mion, PLLC

(57) ABSTRACT

An optical connector cleaning device which cleans a connecting terminal surface of a to-be-cleaned object protruding from an optical connector with a cleaning body, and includes: a main body; an extending part which extends from the main body; and a guiding part attached to a tip portion of the extending part, wherein the extending part includes an extending tube body and a tip extending part; the guiding part includes a fitting part and a tube-shaped guiding body, which is flexible and extends from the fitting part towards an extending direction; an insertion hole is formed; and the to-be-cleaned object is cleaned by inserting the to-be-cleaned object into the insertion hole, and by pressing the cleaning body against the connecting terminal surface of the to-be-cleaned object.

6 Claims, 23 Drawing Sheets

CLEANING DEVICE OF OPTICAL CONNECTOR

BACKGROUND OF THE INVENTION

The present application claims priority on Japanese Patent Application No. 2009-295987, filed Dec. 25, 2009, the content of which is incorporated herein by reference.

FIELD OF THE INVENTION

The present invention relates to a cleaning device of an optical connector, which cleans a connecting terminal surface of the optical connector by feeding and moving a cleaning body.

DESCRIPTION OF THE RELATED ART

When a connection of an optical connector is made, and a connecting terminal surface of the optical connector is dirty, or a foreign particle is attached to the connecting terminal surface, the optical connector might be damaged during the attaching and detaching of the optical connector. In addition, an increase in the optical transmission loss might be triggered. Therefore, it is necessary to clean the connecting terminal surface before the optical connector is abutted and connected.

In order to clean the connecting terminal surface, a cleaning device of an optical connector has been used, which cleans the connecting terminal surface by contacting the connecting terminal surface (see, for example, Japanese Unexamined Patent Application, First Publication No. 2002-90576 (hereinafter may be referred to as "Patent Document 1")).

Some optical connectors are structured so that a ferrule, which is the object that is to be cleaned (hereinafter may be referred to as a "to-be-cleaned object"), protrudes from the optical connector. In order to clean this type of optical connector, a tube-shaped guiding part leads a head part of a cleaning device to a connecting terminal surface of the to-be-cleaned object. In this way, the to-be-cleaned object is cleaned.

However, when this type of optical connector is cleaned, and the cleaning device tilts, the guiding part may tilt as well. As a result, a significant amount of force might be applied to the to-be-cleaned object in the bending direction.

Considering the problems described above, an object of the present invention is to provide a cleaning device of an optical connector which prevents an unreasonable amount of force from being applied to a to-be-cleaned object while cleaning an optical connector structured so that the to-be-cleaned object protrudes from the optical connector. In addition, the present invention aims to prevent the to-be-cleaned object from being broken during the cleaning operation.

SUMMARY OF THE INVENTION

In order to attain the above objects, the present invention provides the following configurations:

A cleaning device of an optical connector according to an aspect of the present invention cleans a connecting terminal surface of a to-be-cleaned object protruding from an optical connector by wiping the connecting terminal surface with a cleaning body. The optical connector cleaning device includes: a main body including a feeding mechanism which supplies and wraps up the cleaning body; an extending part which extends from the main body; and a guiding part attached to a tip portion of the extending part, wherein the extending part includes an extending tube body and a tip extending part. The tip extending part presses the cleaning body to the connecting terminal surface. In addition, the guiding part includes a fitting part, which is fit to a tip portion of the extending tube body, and a tube-shaped guiding body, which is flexible and extends from the fitting part towards an extending direction in which the extending part is extended; an insertion hole is formed, into which the to-be-cleaned object is inserted from a tip side of the guiding body, and, into which the tip extending part is inserted from a rear end side of the guiding body; and the to-be-cleaned object is cleaned by inserting the to-be-cleaned object into the insertion hole of the guiding part attached to the tip portion of the extending part, and by pressing the cleaning body against the connecting terminal surface of the to-be-cleaned object.

In addition, the above cleaning device of the optical connector may be configured as follows: the guiding body comprises a tapering tube part, a thickness of which decreases while the tapering tube part extends towards the extending direction, and a tip tube part, which has a substantially uniform thickness and extends from a tip of the tapering tube part towards the extending direction; and the substantially uniform thickness of the tip tube part is smaller than or equal to a minimum thickness of the tapering tube part.

In addition, the above cleaning device of the optical connector may be configured as follows: one or more groove part is formed on an outer peripheral surface of the tapering tube part in a direction perpendicular to the extending direction.

In addition, the above cleaning device of the optical connector may be configured as follows: the guiding part is an integrated product including resin material.

In addition, the above cleaning device of the optical connector may be configured as follows: the guiding part includes polyester elastomer.

In addition, the above cleaning device of the optical connector may be configured as follows: the tip extending part is flexible.

In addition, the above cleaning device of the optical connector may be configured as follows: the extending tube body includes a tube base part and a tip tube part, which is energized by an urging member towards the extending direction with respect to the tube base part; the tip extending part protrudes from a tip of the tip tube part; and the tip tube part adjusts a protrusion length of the tip extending part by moving towards the extending direction with respect to the tube base part.

According to the cleaning device of the optical connector based on the present invention, the guiding body of the guiding part is flexible. As a result, when the cleaning device tilts due to an operation by a cleaning personnel during the cleaning operation, it is possible to reduce the amount of force being applied to the to-be-cleaned object in the bending direction. In this way, the to-be-cleaned object is prevented from being broken.

In addition, even though the cleaning device is tilted, the guiding body can be fitted to the to-be-cleaned object. Consequently, the cleaning operation can be performed more easily.

DETAILED DESCRIPTION OF THE PREFERRED EMBODIMENTS

Hereinafter, an embodiment of a cleaning device of an optical connector (hereinafter, may be simply referred to as a "cleaning device") according to the present invention is described with reference to the figures.

First, an optical connector 60 is described. The optical connector 60 is cleaned using a cleaning device 1.

Figure 30:
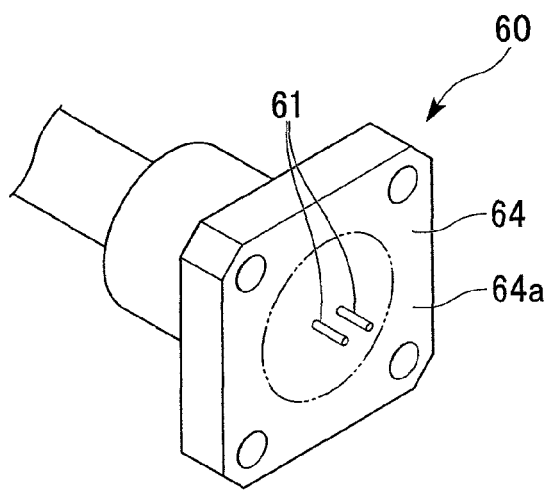
FIG. 30 is a perspective view representing an example of an optical connector for which a cleaning device according to the above embodiment may be used.

As shown in FIG. 30, the optical connector 60 is structured so that one or more ferrule(s) 61 sticks out from one surface 64a of a substrate 64. This ferrule 61 is to be cleaned by the cleaning device.

Figure 24:
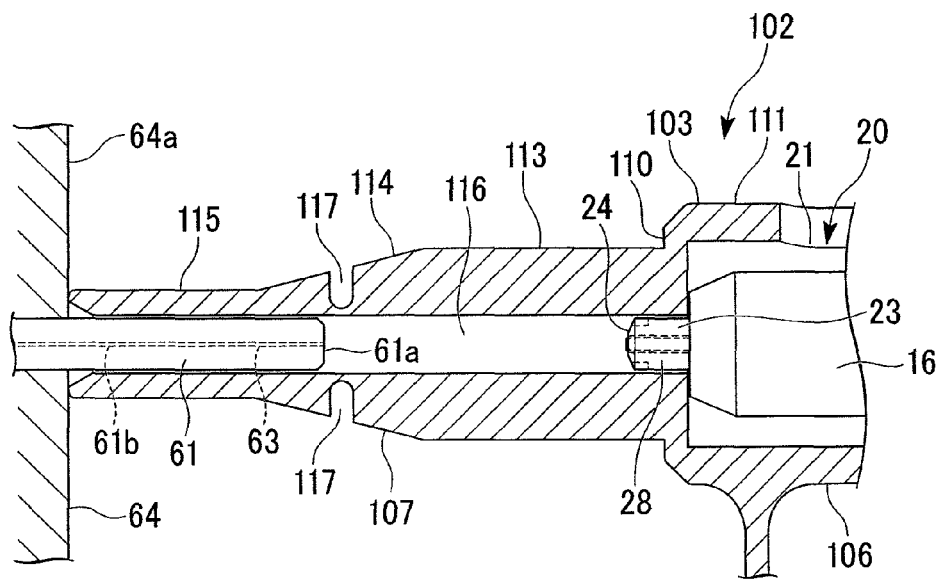
FIG. 24 is a descriptive view representing a movement of a head part according to the above embodiment.
Figure 26:
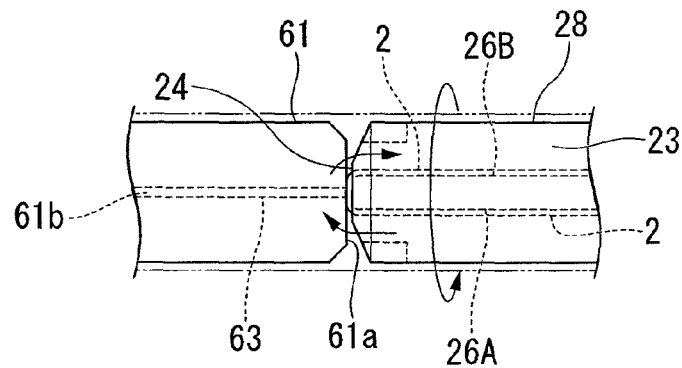
FIG. 26 is a descriptive view representing a movement of a head part according to the above embodiment.

As shown in FIGS. 24 and 26, an optical fiber hole 61b (a pore) is provided in a center portion of a connecting terminal surface 61a of the ferrule 61. An optical fiber 63 is inserted in the optical fiber hole 61b. A tip of this optical fiber 63 is exposed on the connecting terminal surface 61a.

The optical fiber 63 is, for example, an optical fiber bare wire obtained by removing a resin covering a tip portion of an optical fiber core wire. A terminal of the optical fiber 63 is formed so that the terminal can be abutted and connected to another optical connector.

Next, a structure of the cleaning device 1 is described.

Figure 1:
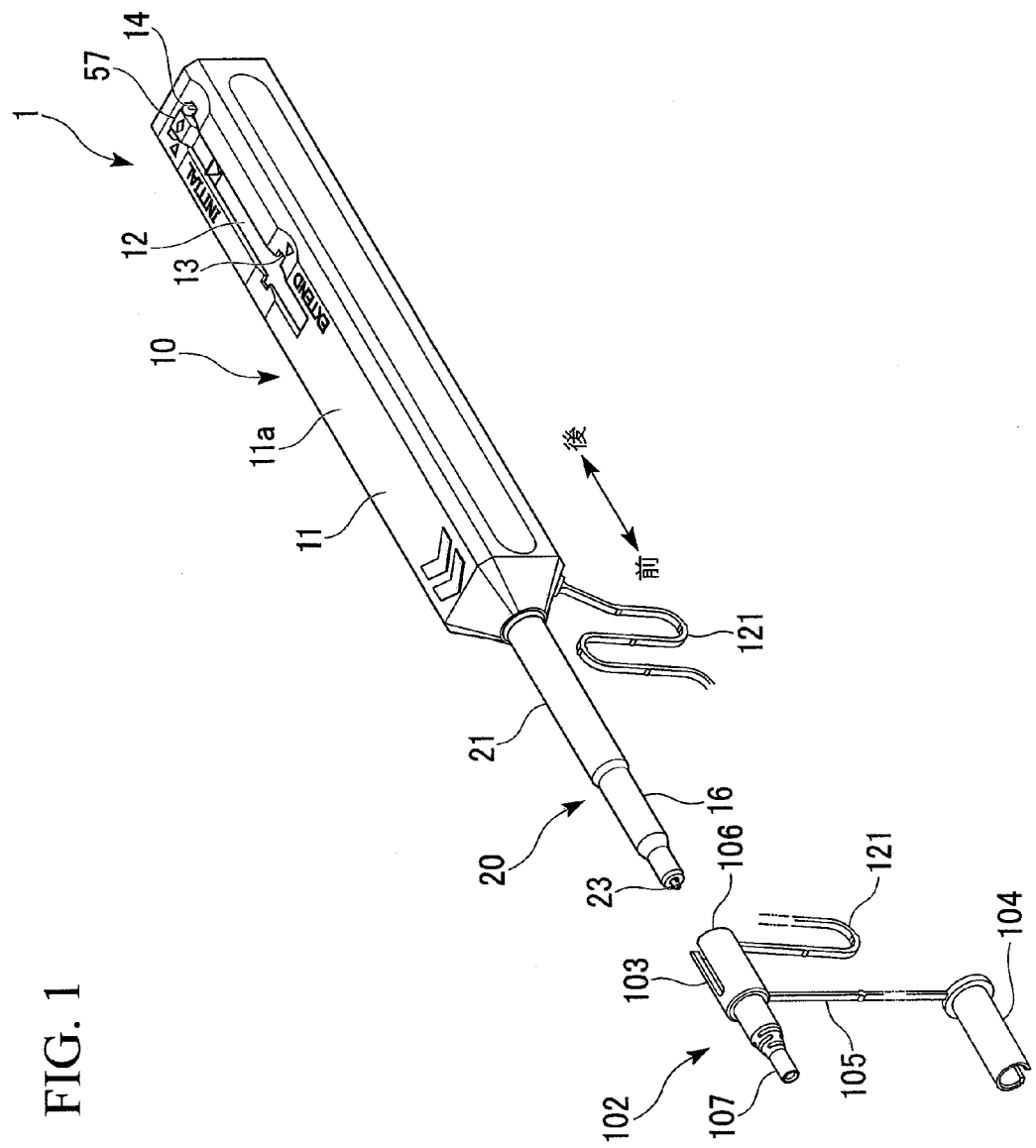
FIG. 1 is a perspective view of a cleaning device of an optical connector according to an aspect of the present invention.
Figure 2:
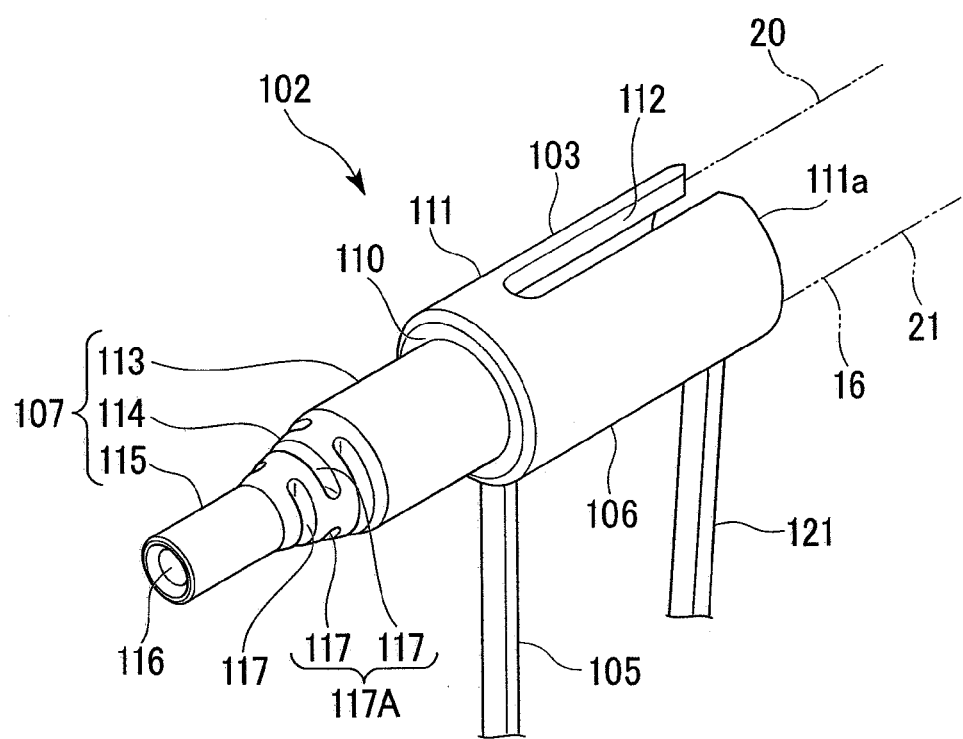
FIG. 2 is a perspective view representing a guiding part of a cleaning device according to the above embodiment.
Figure 3:
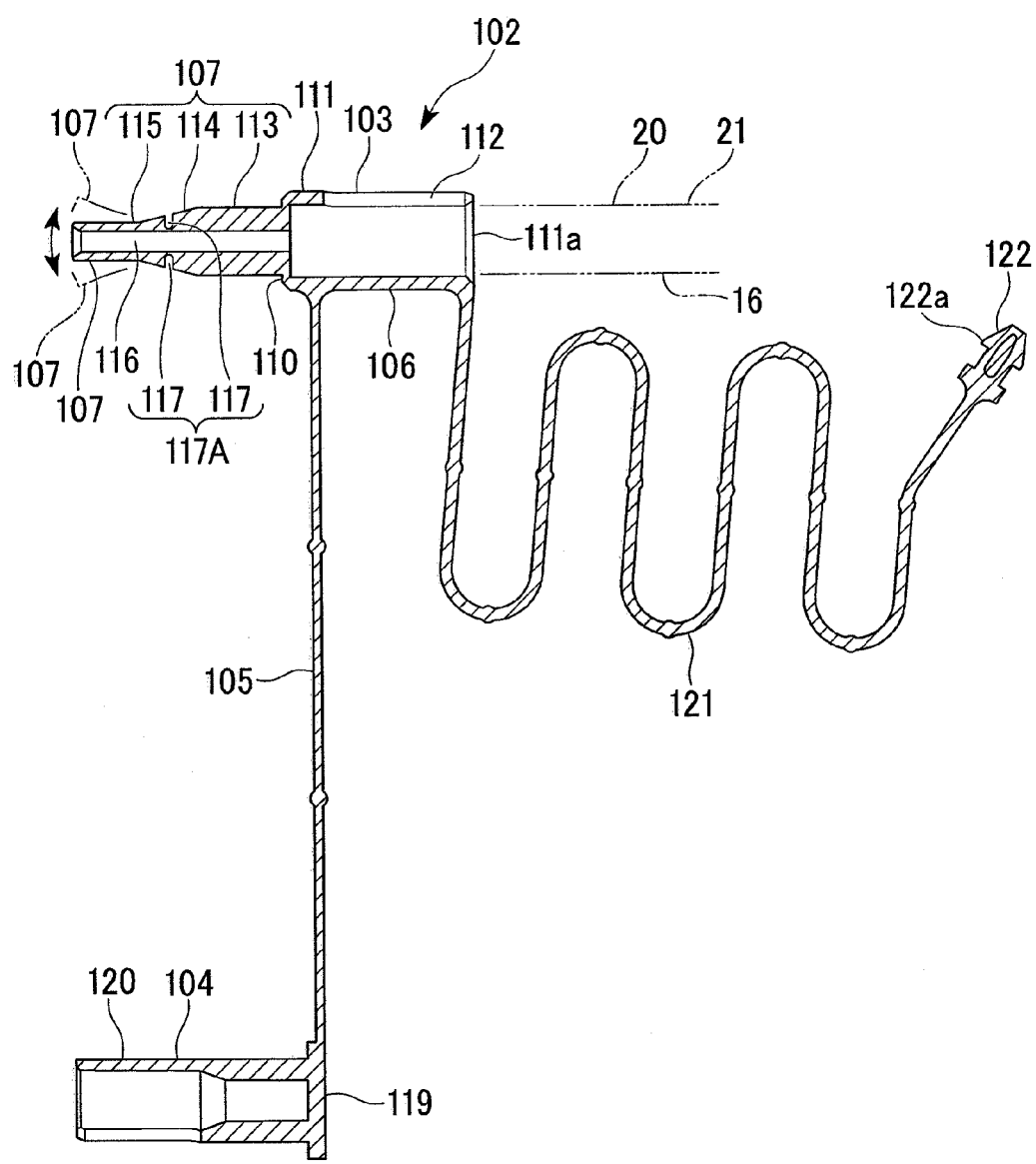
FIG. 3 is a cross-sectional diagram representing a guiding part of a cleaning device according to the above embodiment.
Figure 4:
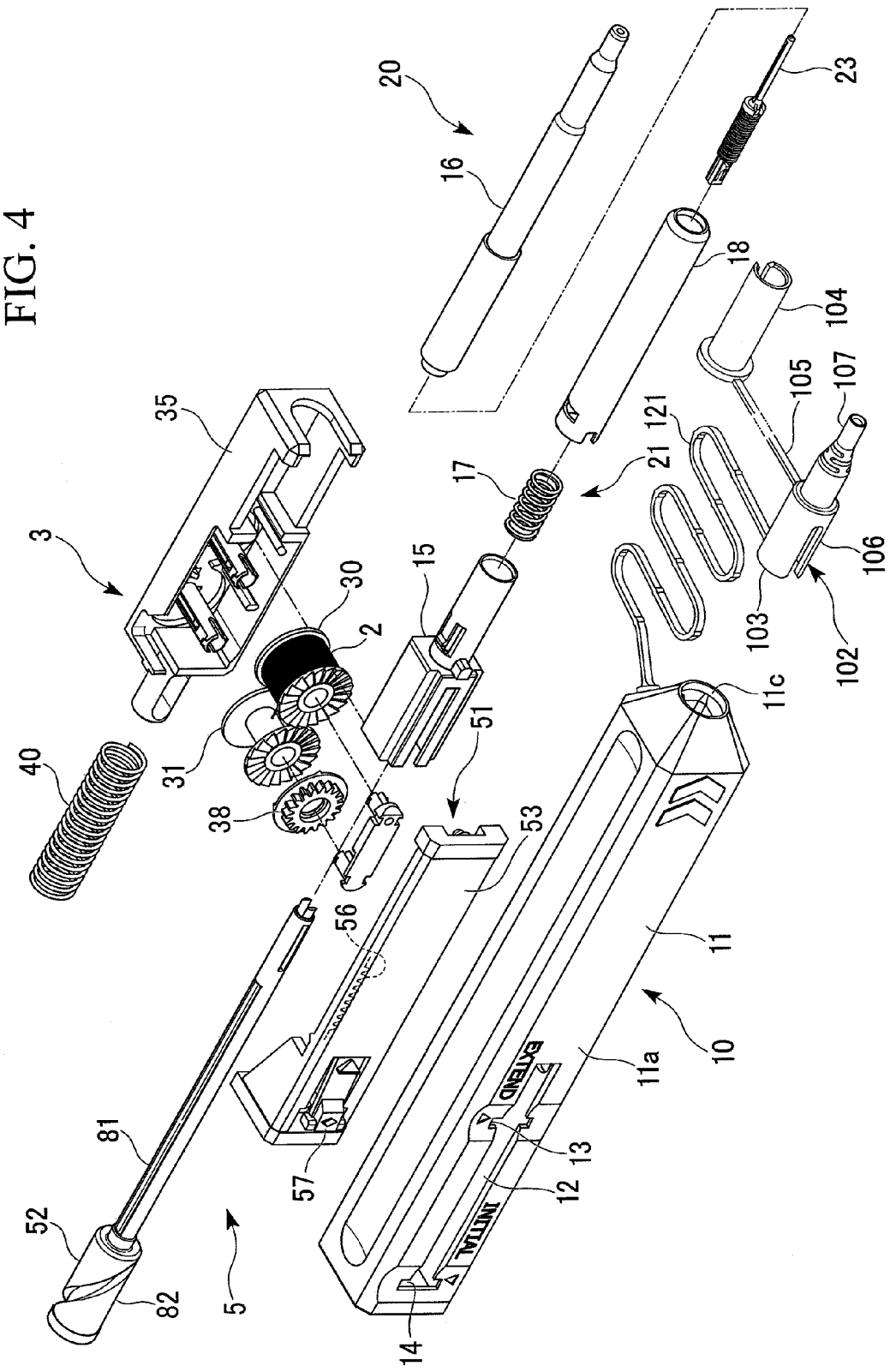
FIG. 4 is an exploded perspective view of a cleaning device according to the above embodiment.
Figure 5:
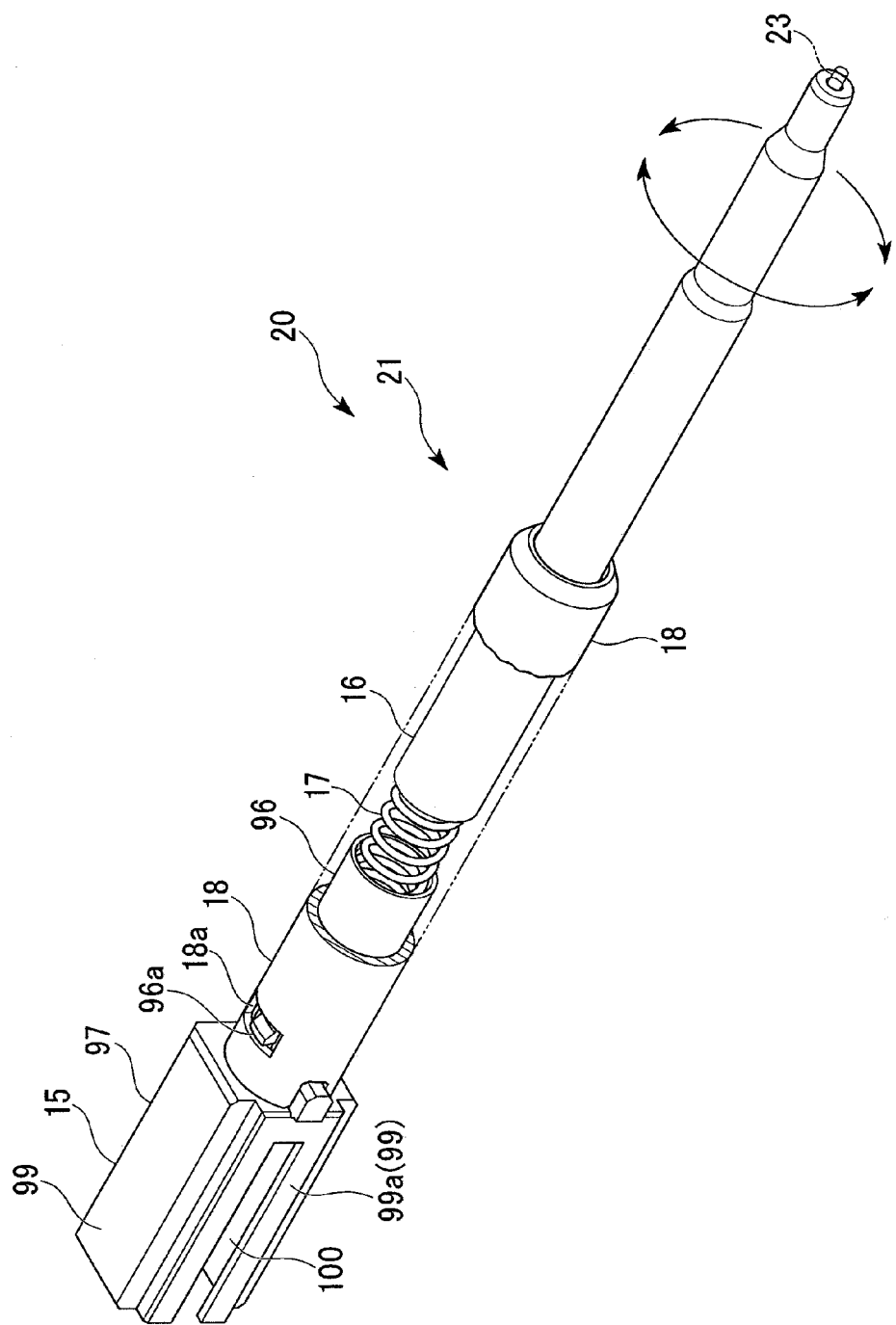
FIG. 5 is a perspective view representing an extending tube body according to the above embodiment.
Figure 6:
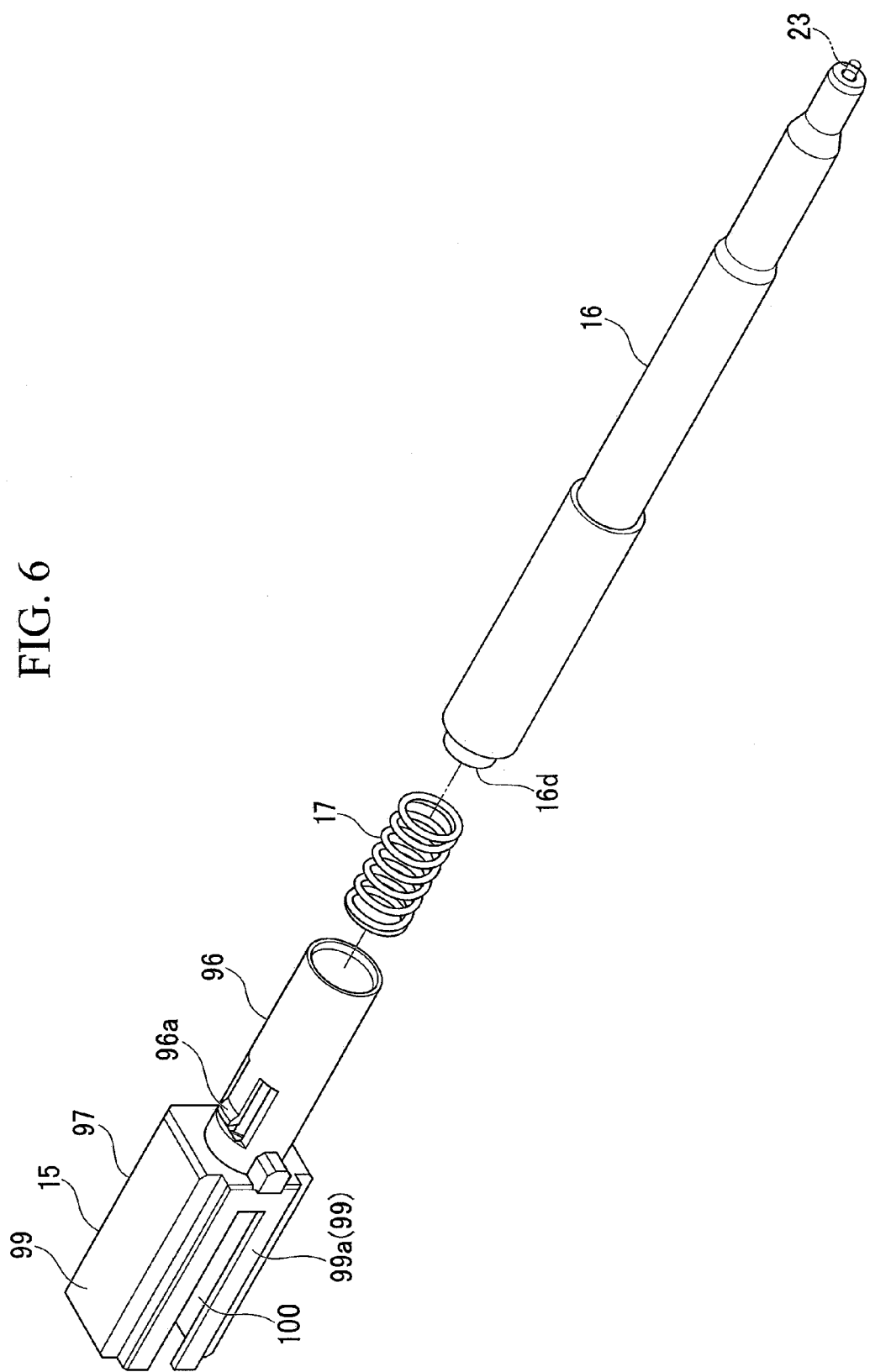
FIG. 6 is an exploded perspective view representing an extending tube body according to the above embodiment.
Figure 7:
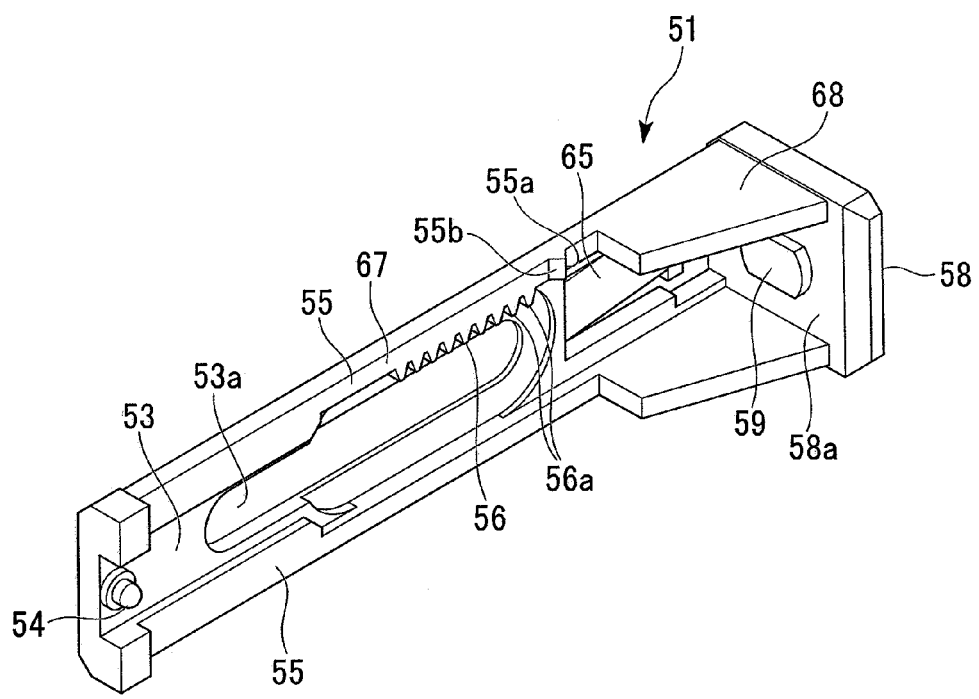
FIG. 7 is a perspective view representing a supporting body according to the above embodiment.
Figure 8:
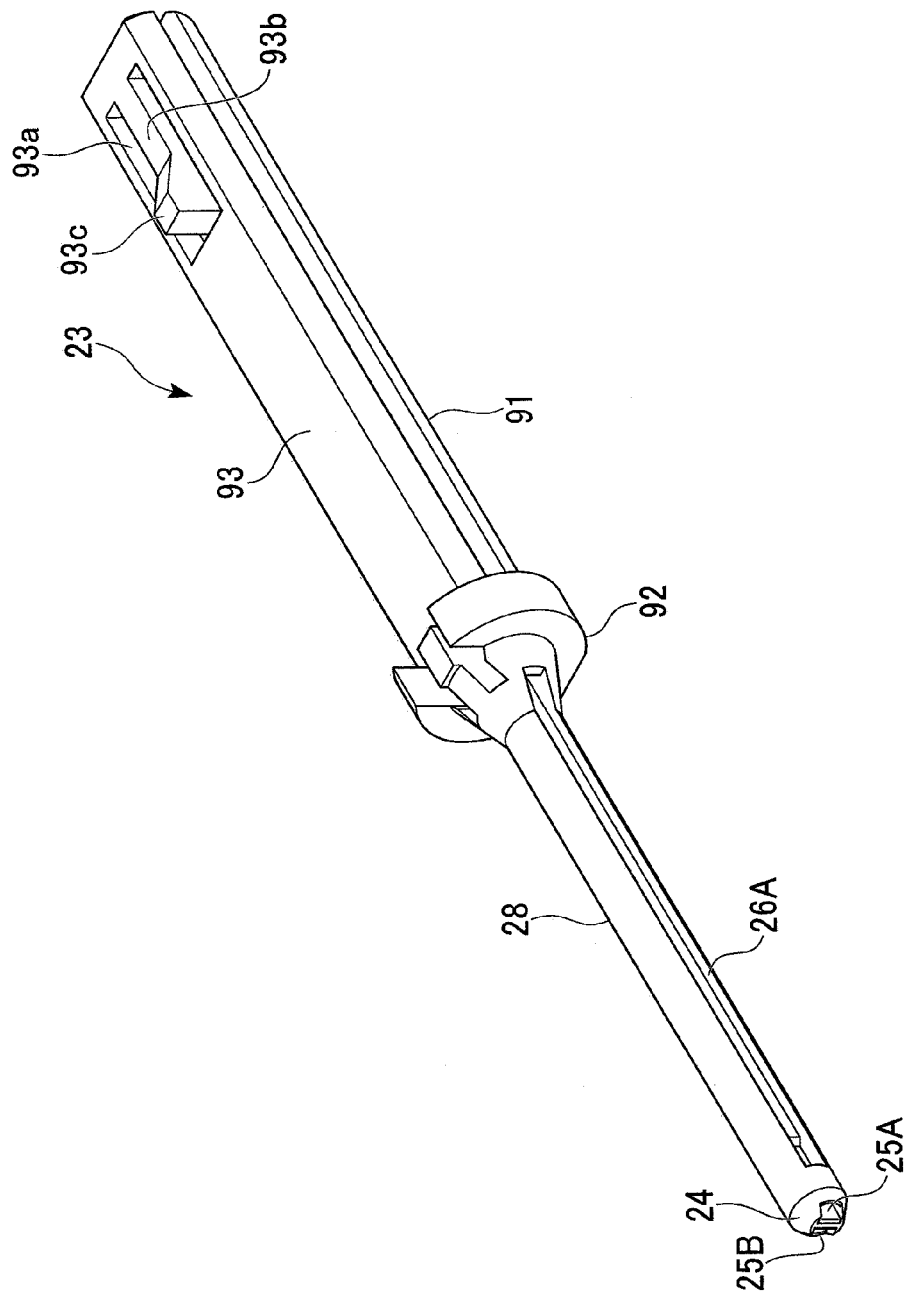
FIG. 8 is a perspective view representing a head part according to the above embodiment.
Figure 9:
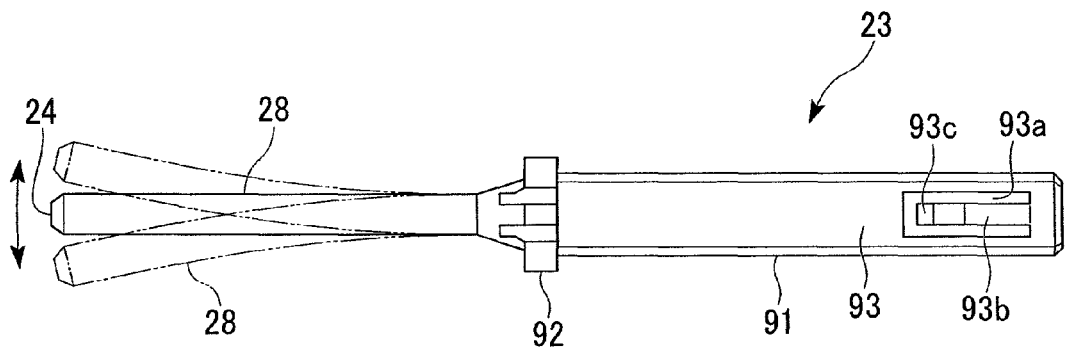
FIG. 9 is a plane view representing a head part according to the above embodiment.
Figure 10:
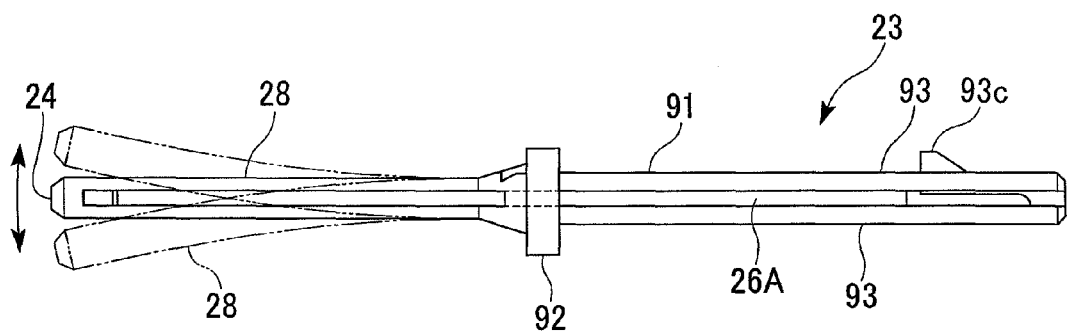
FIG. 10 is a side view representing a head part according to the above embodiment.
Figure 11:
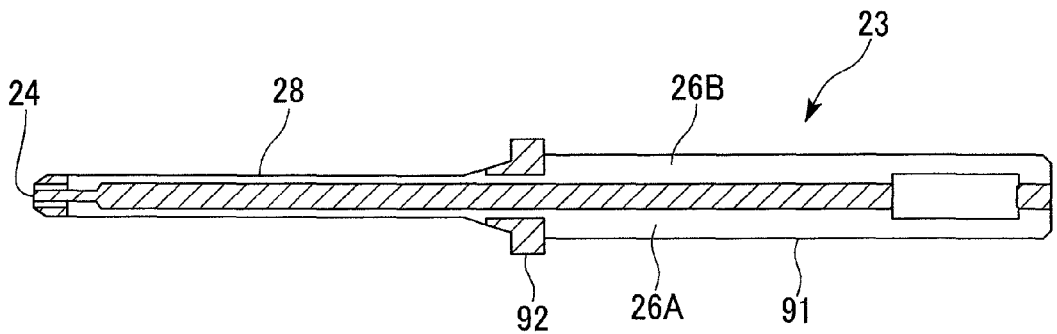
FIG. 11 is a cross-sectional diagram representing a head part according to the above embodiment.
Figure 12:
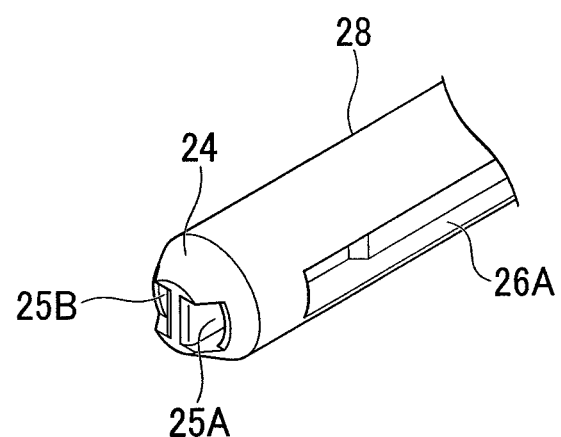
FIG. 12 is a perspective view representing a tip portion of a head part according to the above embodiment.
Figure 13:
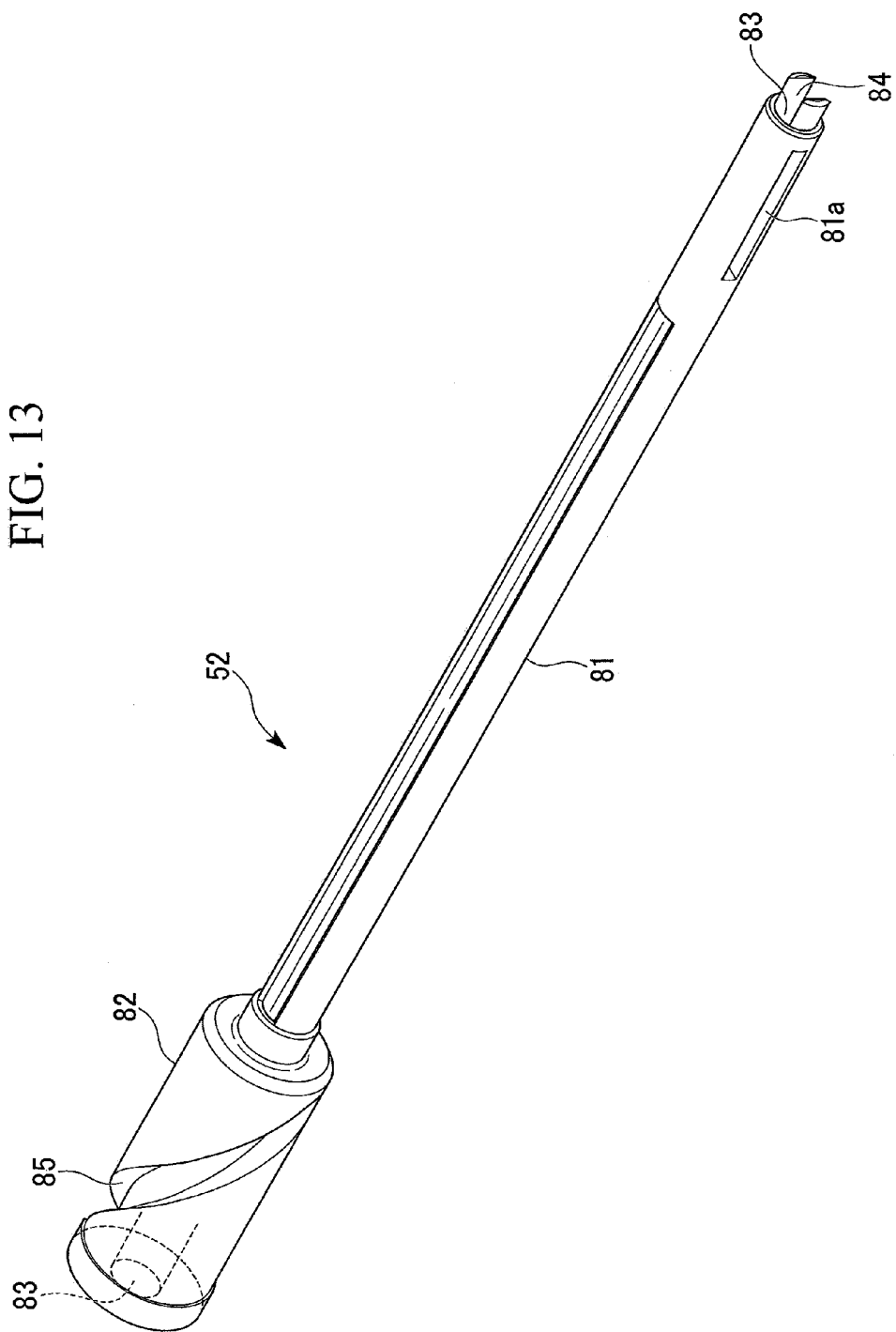
FIG. 13 is a perspective view representing a rotational shaft of a rotational mechanism according to the above embodiment.
Figure 14:
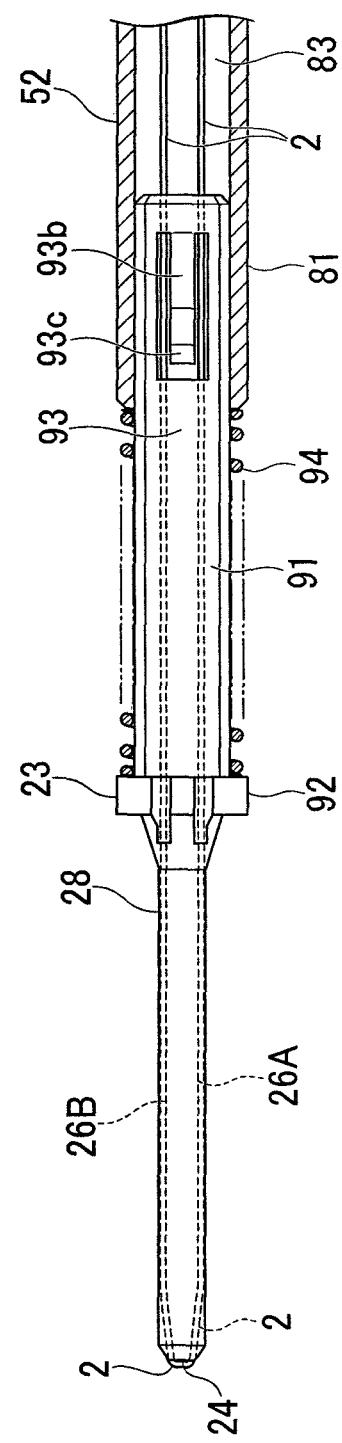
FIG. 14 is a plane view of a rotational shaft and a head part attached to a tip of the rotational shaft according to the above embodiment. A part of the diagram is drawn in a cross-sectional view.
Figure 15:
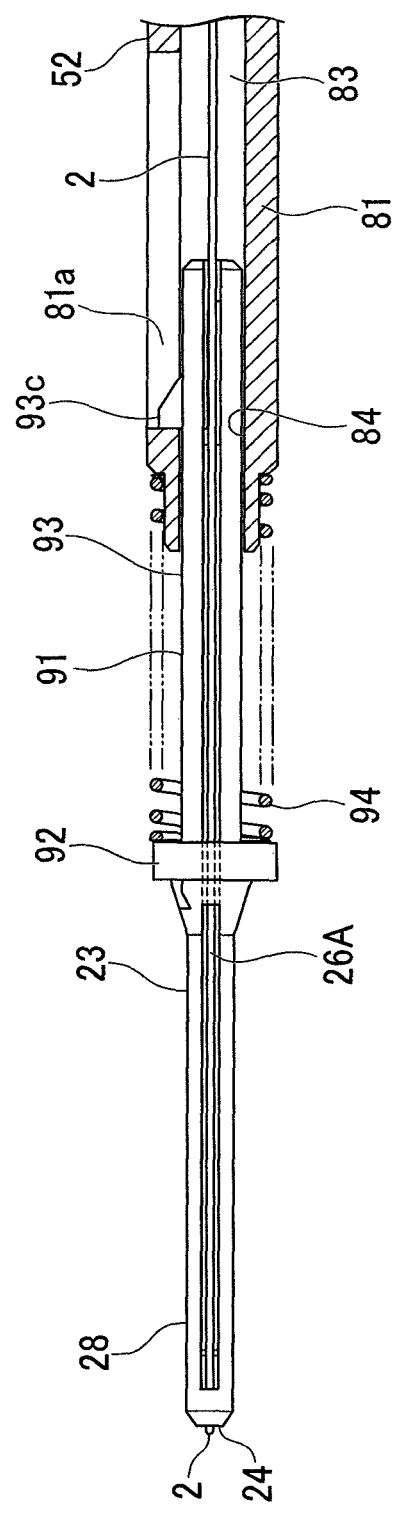
FIG. 15 is a side view of a rotational shaft and a head part attached to a tip of the rotational shaft according to the above embodiment. A part of the diagram is drawn in a cross-sectional view.
Figure 16:
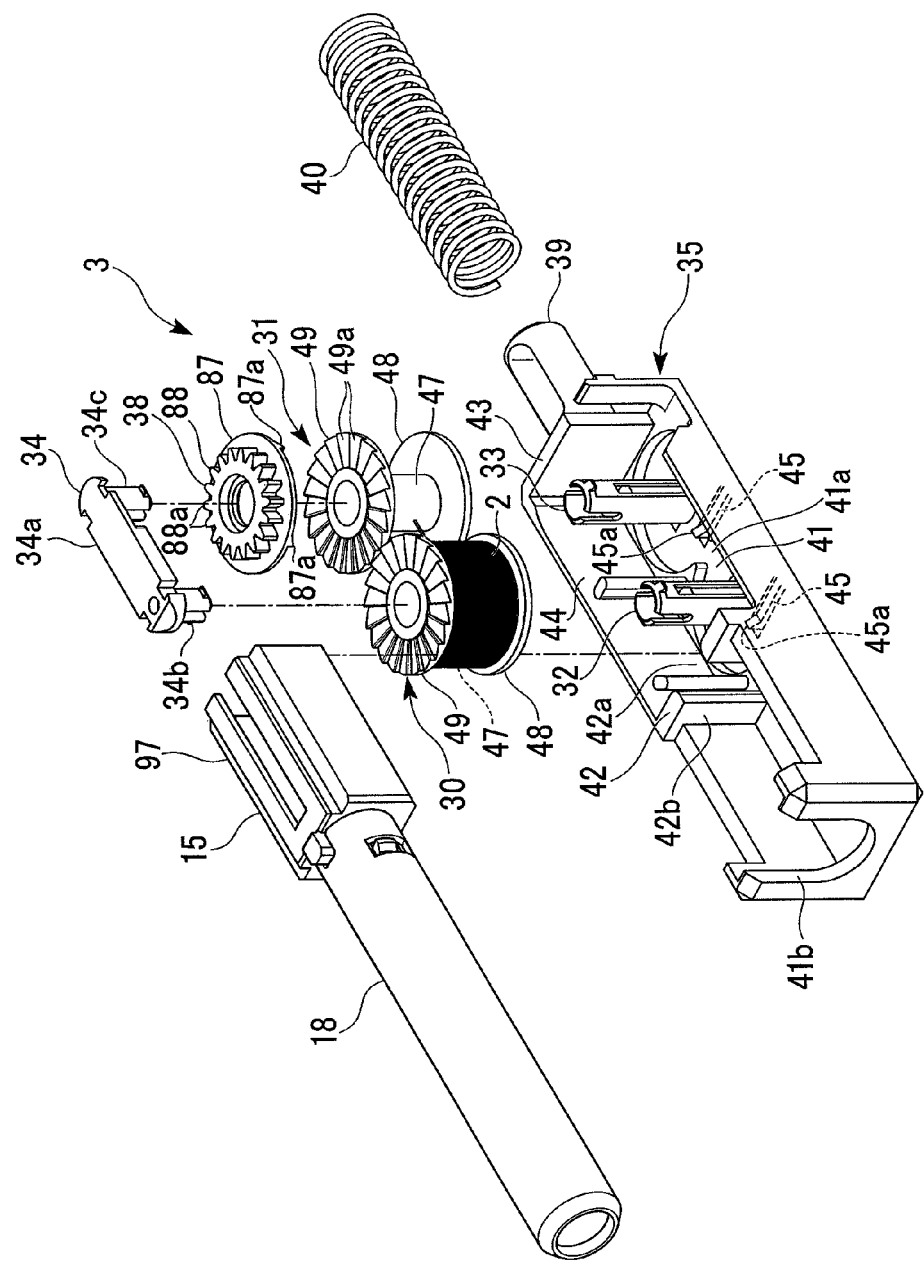
FIG. 16 is an exploded perspective view representing a feeding mechanism according to the above embodiment.

FIG. 1 is a perspective view of the cleaning device 1 of an optical connector according to the present embodiment. FIG. 2 is a perspective view representing a guiding part 102 of the cleaning device 1. FIG. 3 is a cross-sectional diagram representing the guiding part 102. FIG. 4 is an exploded perspective view of the cleaning device 1. FIG. 5 is a perspective view representing an extending tube body 21. FIG. 6 is an exploded perspective view representing the extending tube body 21. FIG. 7 is a perspective view representing the supporting body 51. FIG. 8 is a perspective view representing a head part 23. FIG. 9 is a plane view representing the head part 23. FIG. 10 is a side view representing the head part 23. FIG. 11 is a cross-sectional diagram representing the head part 23. FIG. 12 is a perspective view representing a tip portion of the head part 23. FIG. 13 is a perspective view representing a rotational shaft 52 of a rotational mechanism 5. FIG. 14 is a plane view of the rotational shaft 52 and the head part 23 attached to a tip of the rotational shaft 52. A part of FIG. 14 is drawn in a cross-sectional view. FIG. 15 is a side view of the rotational shaft 52 and the head part 23 attached to a tip of the rotational shaft 52. A part of FIG. 15 is drawn in a cross-sectional view. FIG. 16 is an exploded perspective view representing the feeding mechanism 3.

As shown in FIG. 1, the cleaning device 1 includes a main body 10, an extending part 20 which extends from the main body 10, and a guiding part 102 which is attached to a tip portion of the extending part 20.

In the following description, a "frontal direction" refers to the direction in which the extending part 20 shown in FIG. 1 extends, i.e., the direction of the tip of the extending part 20. A "rear direction" is referred to as the direction opposite to the frontal direction.

As shown in FIGS. 2 and 3, the guiding part 102 includes a main body part 103 and a lid 104. The main body part 103 is attached to a tip portion of a tip tube part 16 of the extending part 20. The lid 104 is connected to the main body part 103 through a connecting body 105.

It is preferred that the guiding part 102 include resin material such as polyester elastomer. A block copolymer including a hard segment comprising crystalline polyester and a soft segment comprising an amorphous polyester or a polyether is a preferred example of the polyester elastomer. In particular, Hytrel® (a product manufactured by DuPont-Toray/TDC), Pelprene® (a product manufactured by Toyobo Co., LTD), and the like, are used.

Polyoxymethylene (POM, polyacetal), polypropylene, and polyamide may be used as a resin material included in the guiding part 102.

The main body part 103 includes a fitting part 106 and a guiding body 107. The fitting part 106 is fixed to a tip portion of the tip tube part 16 of the extending part 20 so that the fitting part 106 can be attached and detached. The guiding body 107 is in the form of a tube, and extends from the front end of the fitting part 106.

The fitting part 106 includes a circular front wall part 110 and a tube part 111. The tube part is cylindrical, and extends rearwards from the peripheral rim of the front wall part 110. The tube part 111 is formed so that a tip portion of the tip tube part 16 can be inserted from the rear end side (see FIG. 24).

It is preferred that the inner diameter of the tube part 111 is approximately equal to the outer diameter of the tip tube part 16, or somewhat smaller than the outer diameter of the tip tube part 16.

A slit 112 is formed on the tube part 111. The slit 112 has a constant width, and is directed from the rear end 111*a* towards the tip portion. The inner space of the tube part 111 is expanded by a deformation in the direction in which the slit 112 is flared. As a result, the tip tube part 16 can be easily inserted.

The guiding body 107 is flexible and is shaped as a tube. This guiding body 107 includes a base tube part 113, a tapering tube part 114, and a tip tube portion 115. The base tube part 113 is cylindrical and extends towards the front side from a front surface of the front wall part 110. The tapering tube part 114 extends towards the front side from a tip of the base tube part 113, with the outer diameter of the tapering tube part 114 decreasing gradually. The cross-section of the tapering tube part 114 is shaped approximately as a circle. The tip tube portion 115 extends towards the front side from a tip of the tapering tube part 114.

An insertion hole 116 into which the head part 23 and the ferrule 61 are configured to be inserted is formed in the guiding body 107. The inner diameter of the insertion hole 116 is constant.

The insertion hole 116 is formed so as to penetrate the guiding body 107 in the axial direction (in the front-rear direction). The insertion hole 116 is connected to the inner space of the fitting part 106. The ferrule 61 can be inserted to the insertion hole 116 from the tip side of the insertion hole 116. The tip extending part 28 of the head part 23 can be inserted from the rear side of the insertion hole 116.

The inner diameter of the insertion hole 116 is determined so that the head part 23 and the ferrule 61 can be positioned, with the axes of the head part 23 and the ferrule 61 being along the same line. As a result, the connecting terminal surface 61*a* of the ferrule 61 can be cleaned with certainty.

In particular, it is preferred that the inner diameter of the insertion hole 116 be the same as the outer diameter of the tip extending part 28 of the head part 23 and the outer diameter of the ferrule 61, or slightly larger. The inner diameter of the insertion hole 116 can be made constant in the longitudinal direction.

The base tube part 113 is formed as a cylinder with an approximately constant outer diameter. It is preferred that the thickness of the wall of the base tube part 113 be approximately constant in the longitudinal direction (the front-rear direction).

Since the wall of the base tube part 113 is rather thick, it is possible to restrain the guiding body 107 from being deformed unreasonably. In addition, the head part 23 and the ferrule 61 can be positioned easily.

The tapering tube part 114 is formed so that the outer diameter gradually decreases towards the frontal direction. As a result, the thickness of the wall of the tapering tube part 114 also becomes gradually thinner towards the frontal direction. As a result, the flexibility of the tapering tube part 114 increases towards the frontal direction. In the diagramed example, the maximum thickness of the wall of the tapering tube part 114 (the thickness of the wall at the base terminal part of the tapering tube part) is equal to the thickness of the wall of the base tube part 113.

One or more groove parts 117 is formed on the outer peripheral surface of the tapering tube part 114 in order to enhance the flexibility of the tapering tube part 114. The groove part 117 may be formed in a direction orthogonal to the axial direction of the tapering tube part 114 (the front-rear direction). In the diagramed example, the groove part 117 is formed perpendicular to the axial direction. However, the direction in which the groove part 117 is formed is not limited to a direction orthogonal to the axis. The groove part 117 may be formed in a direction so that the groove part 117 and the axis form an angle greater than or equal to 0° and less than 90°.

The portion of the tapering tube part 114 at which the groove part 117 is formed is thin. As a result, the flexibility is enhanced.

In the diagramed example, a group of groove parts 117A is formed by placing two groove parts 117 in a position so that the two groove parts 117 are rotationally symmetric to each other. Three groups of the groove parts 117A are formed with a space provided in front of and in the back of each group 117A. Each group 117A is formed so that one group 117A is rotated 90° from the adjacent group. As a result of this structure, the tapering tube part 114 can adjust to bending movements in various directions.

The angle of one groove part 117 in the peripheral direction (rotating in the axial direction) is, for example, 60° to 120°.

The tip tube part 115 is formed as a cylinder with an approximately constant outer diameter. It is preferred that the wall of the tip tube part 115 have an approximately uniform thickness in the longitudinal direction (front-rear direction).

It is preferred that the thickness of the wall of the tip tube part 115 be equal to the minimum thickness of the wall of the tapering tube part 114, or smaller.

In the diagrammed example, the outer diameter of the tip tube part 115 is approximately the same as the outer diameter of the front end part of the tapering tube part. The length of the tip tube part 115 may be determined according to the length of the ferrule 61 which is inserted.

As shown in FIG. 3, the guiding body 107 is flexible, and can bend and deform resiliently. There is no limitation on the direction in which the guiding body 107 can be bent. It is preferred that the guiding body 107 can bend and deform in all directions.

The guiding body 107 may be configured so that the base tube part 113, the tapering tube part 114, and the tip tube part 115 can bend and deform. In particular, it is preferred that the tip tube part 115 and the tapering tube part 114 can be bent and deformed easily.

The lid 104 is cylindrical, and has a closing. The lid 104 includes a circular end plane 119 and a cylindrical tube part 120 which extends from one side of the end plane 119. The guiding part 107 can be protected by covering the guiding part 107 with the lid 104.

The lid 104 is connected to the fitting part 106 of the main body part 103 via a connecting body 105. The connecting body 105 is flexible and is connected to the end plane 119. This configuration prevents the lid 104 from being lost.

The guiding part 102 is connected to the case body 11 through a retention cord part 121. This retention cord part 121 is connected to a rear end of the fitting part 106 of the main body part 103. The retention cord part 121 is inserted to an engaging hole (not diagrammed) of the case body 11 with a fixing part 122. The fixing part 122 has an engaging protrusion 122a which protrudes in the peripheral direction. The retention cord part 121 engages with the peripheral rim part of this engaging hole.

The guiding part 102 may be configured as an integrated product comprising the above-referenced resin material such as polyester elastomer. By forming the guiding part 102 as an integrated product, the number of manufacturing steps can be reduced, and the production cost can be lowered.

As shown in FIGS. 1 and 4, the main body 10 of the cleaning device is structured so that a feeding mechanism 3 and a rotational mechanism 5 are provided inside a case body 11. The feeding mechanism 3 provides a cleaning body 2 and rolls up the cleaning body 2. The rotational mechanism 5 rotates the head part 23.

The case body 11 is formed as a tube. The cross-section of the case body 11 is approximately shaped as a rectangle. The case body 11 includes four side wall parts 11a. A positioning opening part 12 is formed in the rear portion of one of the side wall parts 11a. A positioning convex part 57 is inserted in the positioning opening part 12.

The positioning opening part 12 is formed as a slit along the front-rear direction. In the margins of the front and back portions of the positioning opening part 12, a first fitting concave part 13 and a second fitting concave part 14 are formed. The positioning convex part 57 fits in the first fitting concave part 13 and the second fitting concave part 14.

In the front end of the case body 11, an insertion opening 11c is formed. The extending part 20 is inserted in the insertion opening 11c.

As shown in FIG. 4, the rotational mechanism 5 includes a supporting body 51 and a rotational shaft 52. The supporting body 51 is positioned with respect to the case body 11. The rotational shaft can rotate around the axis.

As shown in FIG. 7, the supporting body 51 includes a substrate 53, an insertion protrusion part 54, a side plate 55, and a rear end plate 58. The substrate 53 is rectangular and is placed along the front-rear direction. The insertion protrusion part 54 is formed so as to protrude from the inner surface 53a of the front end part of the substrate 53. The side plate 55 is formed so as to protrude from the margins in both sides of the substrate 53 towards the side of the inner surface 53a. The rear end plate 58 is formed so as to extend from the rear end side of the substrate 53 towards the side of the inner surface 53a.

A gear receiving part 56 is formed on one of the side plates 55. The gear receiving part 56 is shaped like a sawtooth.

The gear receiving part 56 includes a plurality of receiving tooth parts 56a. The receiving tooth part 56a protrudes from one of the side plates 55 towards the other side plate 55. The receiving tooth part 56a is aligned in the longitudinal direction (front-rear direction) of the supporting body 51.

The retention convex part 59 is formed in the front surface 58a of the rear end plane 58.

The insertion convex part 54 is shaped approximately as a cylinder. The protrusion height of the insertion convex part 54 and the outer diameter of the insertion convex part 54 are determined so that the insertion convex part 54 can fit the cam groove 85 of the rotational tube part 82.

A plate-like resilient piece 65 is formed in a rear portion of the substrate 53. A positioning convex part 57 is formed on the upper surface (outer surface) of the rear end part of the resilient piece 65. The positioning convex part 57 protrudes in the upper direction (outer direction). See FIG. 4.

As shown in FIGS. 4 and 13-15, the rotational shaft 52 includes a rotational tube part 82 and a guiding tube part 81. The guiding tube part 81 extends from a front end of the rotational tube part 82 towards the front.

An insertion hole 83 is formed inside the rotational shaft 52 from a front end of the guiding tube part 81 to a rear end of the rotational tube part 82.

The guiding tube part 81 is shaped approximately as a cylinder. At a front end part of this guiding tube part 81, an insertion part 91 of the head part 23 can be inserted in the insertion hole 83. A rotational stopping part 84 is formed on the inner side of the front end part of the guiding tube part 81. The inner surface of the rotational stopping part 84 is formed to be flat.

As shown in FIG. 13, the rotational tube part 82 is formed approximately as a cylinder. The cam groove 85 is formed on the outer surface of the rotational tube part 82. The insertion convex part 54 of the supporting body 51 is inserted in the cam groove 85.

At least a part of the cam groove 85 is formed in a slanted manner with respect to the axial direction of the rotational tube part 82 in the front-back direction. Therefore, as described later, when the rotational shaft 52 shifts in the front-back direction, the rotational tube part 82 moves along the cam groove 85. As a result, the rotational shaft 52 rotates around the axis. In the diagrammed example, the cam groove 85 is formed in a spiral form.

As shown in FIGS. 8 to 12, the head part 23 includes an insertion part 91, a flange part 92, and a tip extending part 28. The insertion part 91 can be inserted in the insertion hole 83 of the guiding tube part 81. The flange part 92 is formed in the front end of the insertion part 91. The tip extending part 28 is approximately cylindrical, and extends from the front surface of the flange part 92 towards the frontal direction.

The tip surface of the tip extension part 28 becomes a pressing surface 24 which presses the cleaning body 2 against the connecting terminal surface 61a.

As shown in FIGS. 9 and 10, the tip extending part 28 is flexible, and can be bent and deformed resiliently. There is no limitation on the direction in which the tip extending part 28 is bent. It is preferred that the tip extending part 28 can bend in all directions.

The outer diameter of the tip extending part 28 is set so that the tip extending part 28 can be inserted in the insertion hole 116 of the guiding part 102. For example, the outer diameter can be set to 1.0 mm-1.44 mm.

The length of the tip extending part 28 is set so that the cleaning body 2 on the pressing surface 24 can reach the connecting terminal surface 61a of the ferrule 61.

A guide opening part 25A, 25B (a guiding part) is formed on the pressing surface 24. The guide opening part is an opening through which the cleaning body 2 is inserted.

One of the guide opening parts 25A leads the cleaning body 2, supplied by the feeding mechanism 3, to the pressing surface 24. The other guide opening part 25B leads the cleaning body 2, which has already moved across the pressing surface 24, to the feeding mechanism 3. Because the guide opening parts 25A and 25B are formed, the cleaning body 2 is prevented from sliding off of the pressing surface 24.

It is preferred that a guiding groove 26A, 26B be formed on a side surface of the tip extending part 28. The guiding groove guides the movement of the cleaning body 2. The guiding grooves 26A and 26B are also formed on a side surface of the flange part 92 and the insertion part 91.

A flat part 93 is formed on the insertion part 91. The flat part 93 is shaped according to the rotational stopping part 84 formed on the guiding tube part 81. Since the flat part 93 is placed along the rotational stopping part 84, the head part 23 does not rotate with respect to the guiding tube part 81. In the diagramed example, the flat part 93 is formed on both sides of the surface of the insertion part 91.

An opening part 93a is formed on the rear part of one of the flat parts 93 of the insertion part 91. An elastic piece 93b is formed on the rear edge of the opening part 93a. The elastic piece 93b extends forward. An engagement click 93c is formed on the tip of the elastic piece 93b. The engaging click 93c sticks out from the flat part 93.

As shown in FIG. 15, the engaging click 93c can engage with the front edge of the engaging opening part 81a (engaging concave part) formed on the guiding tube part 81. Since the engaging click 93c engages with the front edge of the engaging opening part 81a, the longitudinal movement of the head part 23 is restricted. In this way, the head part 23 is prevented from falling off.

Figure 17:
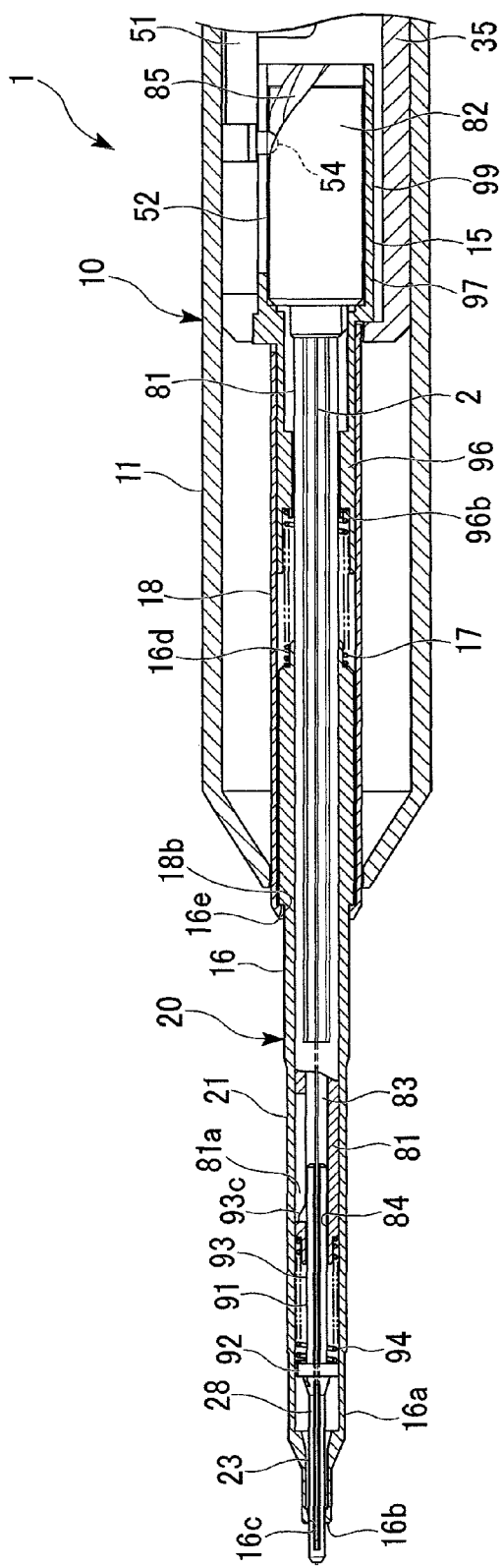
FIG. 17 is a descriptive view representing a movement of a head part according to the above embodiment.

As shown in FIG. 17, the head part 23 is formed so that the tip portion of the tip extending part 28 can be inserted in the insertion opening part 16c of the tip wall part 16b of the tip tube part 16. In a normal state, it is preferred that the tip extending part 28 including the tip portion protrude from the tip wall part 16b.

Incidentally, it is also possible to configure the present invention so that the tip extending part 28 does not protrude from the tip wall part 16b in a normal state.

The head part 23 can be configured as an integrated product including synthetic resin such as polyoxymethylene (POM, polyacetal) and polypropylene.

In particular, since polyoxymethylene is superior in toughness, the durability of the tip extending part 28 can be enhanced by using polyoxymethylene.

As shown in FIGS. 4 and 14-16, a cleaning body 2 is wrapped around the head part 23. The cleaning body 2 is pulled out from a supplying reel 30.

In the diagrammed example, the cleaning body 2 is led from the supplying reel 30 inside the main body 10, passes through the interior of the insertion hole 83 of the rotational shaft 52, passes through the guiding groove 26A and the guide opening part 25A of the head part 23, reaches the pressing surface 24, passes through the guide opening part 25B and the guiding groove 26B, and reaches the wrapping-up reel 31.

There is no limitation on the configuration and material of the cleaning body 2. A known and appropriate cleaning cloth (woven fabric or unwoven fabric) may be transformed into a string (or a cord) or a tape, and may be used as a cleaning body 2. For example, a material made of extra fine fiber such as polyester and nylon may be used.

Reference numeral 94 in FIGS. 14 and 15 indicates an urging member (such as a coil spring) provided between the front end of the guiding tube part 81 and the flange part 92. The urging member 94 energizes the head part 23 in the forward direction when the head part 23 is pressed against the connecting terminal surface 61a.

As shown in FIG. 16, the feeding mechanism 3 includes a supplying reel 30, a wrapping-up reel 31, a supporting part 35, a gear 38, a retaining tube part 39, an urging member 40, and a pressing part 34. The cleaning body 2 is wrapped around the supplying reel 30. The wrapping-up reel 31 wraps up and retrieves the used cleaning body 2. The supplying reel 30 and the wrapping-up reel 31 are attached to the supporting part 35 so that the supplying reel 30 and the wrapping-up reel 31 can rotate. The gear 38 is attached to the wrapping-up reel 31. The retaining tube part 39 is formed on the supporting part 35. The urging member 40 such as a coil spring is attached to the retaining tube part 39.

The supporting part 35 includes a substrate 41, a supplying reel supporting axis 32, a wrapping-up reel supporting axis 33, a partition plate 42, a rear end plate 43, and a side plate 44. The supplying reel supporting axis 32 is provided on the inner surface 41a of the substrate 41. The supplying reel 30 is rotatably attached to the supplying reel supporting axis 32. The wrapping-up reel 31 is rotatably attached to the wrapping-up reel supporting axis 33. The partition plate 42 is formed in an intermediate portion of the substrate 41 in the longitudinal direction. The rear end plate 43 is formed in the rear end portion of the substrate 41. The side plate 44 is formed in the side edge portion of the substrate 41.

Two extension plates 45, 45 are formed on the substrate 41. The extension plates 45, 45, extend in a direction perpendicular to the radial direction of the reel 30, 31. An engaging click 45a, 45a is formed on the tip portion of these extension plates 45, 45. The engaging clicks 45a, 45a stick out, respectively, towards the reels 30, 31. The extension plate 45 can be elastically bent and deformed. The engaging click 45a can move in a direction approaching and moving away from the reels 30, 31.

A notch 41b is formed on the front end of the substrate 41. The tip tube part 16 and the outer tube body 18 fit in the notch 41b.

The pressing part 34 prevents the reels 30, 31 and the gear 38 from falling off. The fitting parts 34b, 34c are formed on the front end and the rear end of the main body part 34a which is shaped as a rectangular plate extending in the longitudinal direction. The reel supporting axes 32, 33 can fit with the fitting parts 34b, 34c.

A passing-through concave part 42a is formed on the partition plate 42. The cleaning body 2 passes through the passing-through concave part 42a.

The supplying reel 30 and the wrapping-up reel 31 include a reel body part 47, a first end plate 48, and a second end plate 49. The cleaning body 2 is wrapped around the reel body part 47. The first end plate 48 is provided on one end of the reel body part 47. The second end plate 49 is provided on the other end of the reel body part 47.

A plurality of engaging concave parts (not diagrammed) are formed on the outer surface of the first end plate 48. These engaging concave parts are aligned in the peripheral direction. Since the engaging click 45a of the extension plate 45 engages with the engaging concave part, the reels 30, 31 are prevented from rotating in the opposite direction. A plurality of engaging convex parts 49a are formed on the outer surface of the second end plate 49. These engaging convex parts are aligned in the peripheral direction.

The reels 30, 31 are attached to the supporting part 35 by inserting the supporting axes 32, 33 through the body part 47.

The gear 38 includes a circular substrate 87 and a gear wheel part 88. The circular substrate 87 is shaped like a circular plate. The gear wheel part 88 is formed on one surface of the circular substrate 87. An engaging protrusion 87a is formed on the other side of the circular substrate 87. The engaging protrusion 87a engages with the engaging convex part 49a of the wrapping-up reel 31.

The gear wheel part 88 includes a plurality of tooth parts 88a which is aligned in the peripheral direction. These tooth parts 88a are formed so as to interlock with the receiving tooth part 56a of the gear receiving part 56 of the supporting body 51.

The gear 38 is placed on the second end plate 49 of the wrapping-up reel 31. The engaging protrusion 87a of the circular substrate 87 engages with the engaging convex part 49a of the second end plate 49. As a result, the wrapping-up reel 31 rotates according to the rotation of the gear 38.

When the gear 38 rotates in a direction opposite to the direction in which the cleaning body 2 is wrapped up, the engaging protrusion 87a is formed so as not to engage with the engaging convex part 49a.

As shown in FIGS. 4 to 6, the extension part 20 includes an extension tube body 21 and a head part 23. The head part 23 is inserted in the extension tube body 21.

The extension tube body 21 includes a tube base part 15, a tip tube part 16, a tube urging member 17, and an outer tube body 18. The tip tube part 16 is provided in the tip side of the tube base part 15. The tube urging member 17 energizes the tip tube part 16 in the frontal direction.

The tube base part 15 includes a retaining frame part 97 and a cylindrical connection tube part 96. The connection tube part 96 extends from the front end of the retaining frame part 97 towards the front side.

The retaining frame part 97 is shaped as a tube with a rectangular cross-section. The rotational tube part 82 of the rotational shaft 52 can be stored inside the retention frame part 97.

The side plate 99a is one of the four side plates 99 included in the retaining frame part 97. A slit 100 is formed on the side plate 99a so that the insertion convex part 54 of the supporting body 51 can be inserted in the slit 100 along the longitudinal direction.

The connection tube part 96 is shaped approximately as a cylinder. The guiding tube part 81 of the rotational shaft 52 can be inserted in the connection tube part 96.

A fitting click 96a is formed on the outer surface of the connection tube part 96. The fitting click 96a fits with the engaging opening part 18a formed on the outer tube body 18.

A step part 96b is formed in the inner surface of the connection tube part 96 (see FIG. 17). The rear end of the tube urging member 17 contacts the step part 96b.

As shown in FIG. 17, the tip tube part 16 includes a tube wall part 16a and a tip wall part 16b. The tip wall part 16b is provided on the front end of the tube wall part 16a.

An insertion opening 16c is formed on the tip wall part 16b. The tip extension part 28 of the head 23 is inserted in the insertion opening 16c.

In the rear end portion of the tip tube part 16, a rear end tube part 16d is formed so as to protrude towards the rear side. The rear end tube part 16d is inserted in the tube urging member 17. Thus, the position of the tip tube part 16 is determined with respect to the tube urging member 17 (see FIG. 6).

The tip tube part 16 can move in the direction in which the tip tube part 16 is extended (towards the tip portion). The tip tube part 16 can also move in the opposite direction.

As shown in FIG. 5 with an arrow, the tip tube part 16 can rotate around the axis with respect to the tube urging member 17 and the outer tube body 18.

A spring member such as a coil spring is preferably used as the tube urging member 17. The rear portion of the tube urging member 17 is inserted in the connection tube part 96. The rear end portion can come in contact with the step part 96b. The front end portion can come in contact with the rear end portion of the tip tube part 16 (see FIGS. 17, 18).

The outer tube body 18 is formed approximately as a cylinder. The connection tube part 96 and the tip tube part 16 can be inserted in the outer tube body 18.

As shown in FIG. 17, a stopper part 18b is formed on the front end part of the outer tube body 18. The stopper part 18b is a convex part protruding inwards. The stopper part 18b contacts the step part 16e of the tip tube part 16. In this way, the stopper part 18b can restrict the tip tube part 16 from moving towards the front. The stopper part 18b exemplified in the figure is a convex part in the form of a band.

As shown in FIGS. 5 and 6, the tube base part 15 includes a retention frame part 97 and a connection tube part 96. The connection tube part 96 is cylindrical and extends from the front end of the retention frame part 97 towards the front.

A fitting click 96a is formed on the outer surface of the connection tube part 96. The fitting click 96a fits with the engaging opening part 18a formed on the outer tube body 18.

As shown in FIG. 1, the extending part 20 can move in the front-rear direction (the direction in which the extending part 20 elongates and contracts) with respect to the case body 11.

According to FIG. 1, the extending part 20 is located somewhat towards the rear side. However, it is also possible to place the extending part 20 towards the front.

Although not diagramed, the extending part 20 can be inserted in the connector storing hole of the optical connector adapter. In this way, the connecting terminal surface of the ferrule inside the connector storing hole can be cleaned.

Next, an example of a cleaning method using the cleaning device 1 is described.

Figure 22:
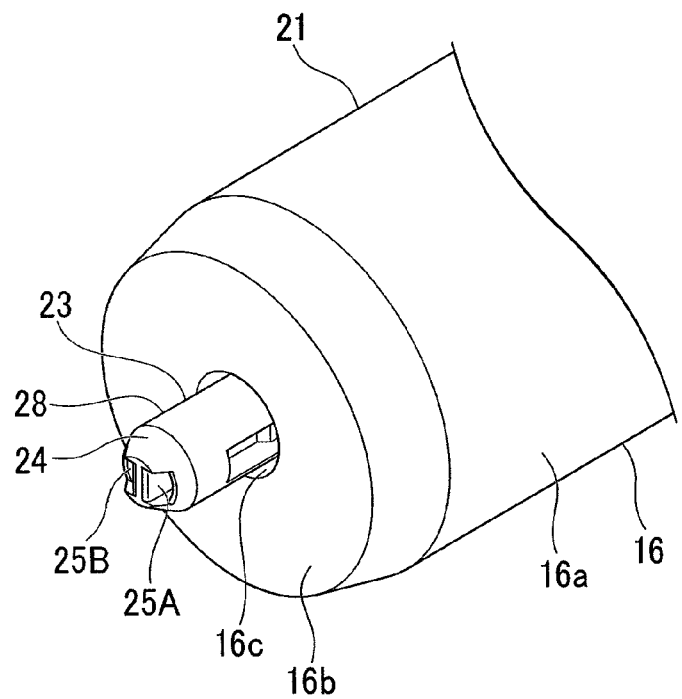
FIG. 22 is a perspective view providing an enlarged view of a relevant component of a cleaning device according to the above embodiment.

According to the normal condition shown in FIGS. 17 and 22, the tube urging member 17 applies a reactive force to the step part 96b of the connection tube part 96, and thus energizes the tip tube part 16 towards the front. Therefore, the tip tube part 16 is positioned somewhat in the front side. This position of the tip tube part 16 is referred to as the front position. Therefore, only a very short portion of the tip extending part 28, including the tip portion, is exposed.

Under this condition, the stopper part 18b of the outer tube body 18 contacts the step part 16e of the tip tube part 16. As a result, the tip tube part 16 is restricted from moving towards the front.

Figure 19:
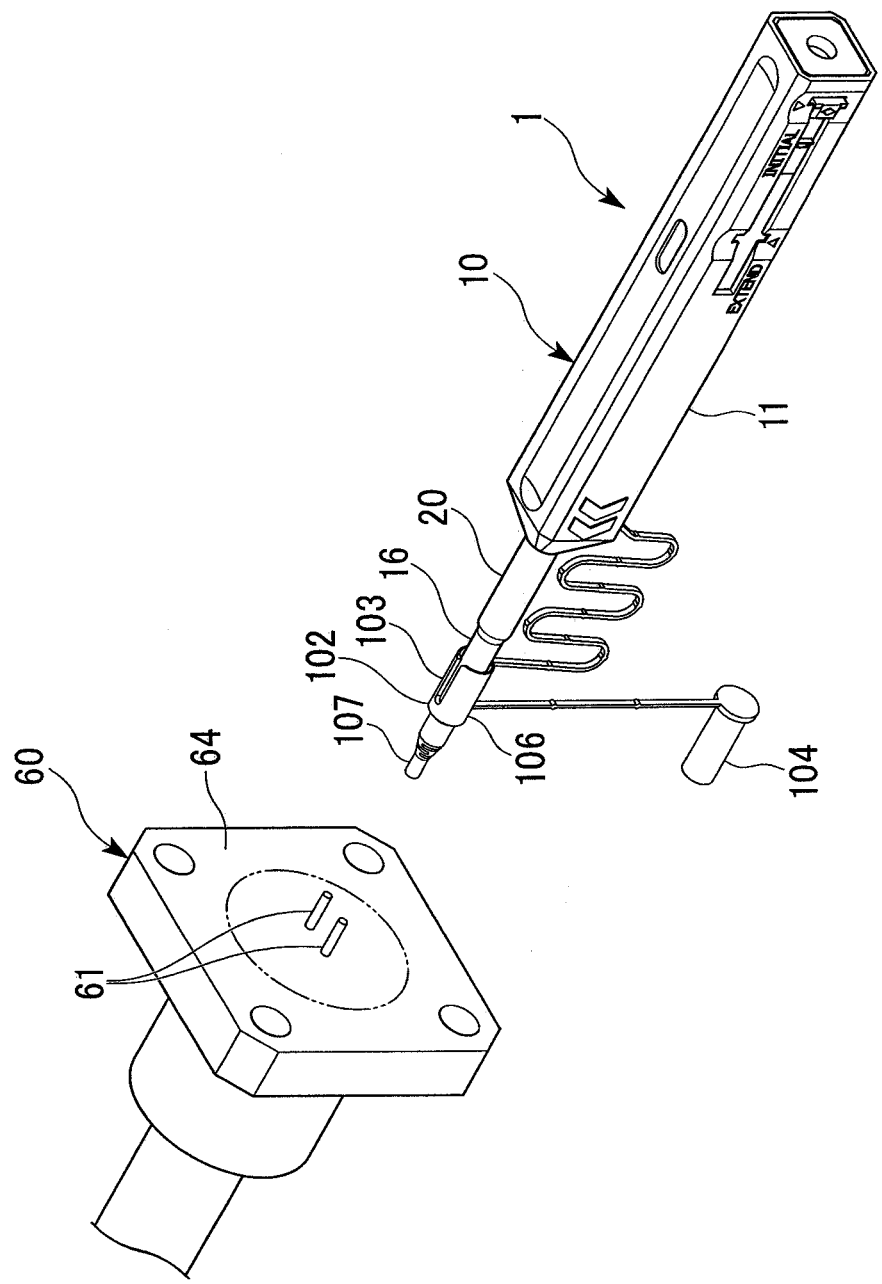
FIG. 19 is a processing diagram representing a method of using a cleaning device of an optical connector according to the above embodiment.

As shown in FIG. 19, the fitting part 106 of the guiding part 102 is fixed to the tip of the tip tube part 16.

Figure 20:
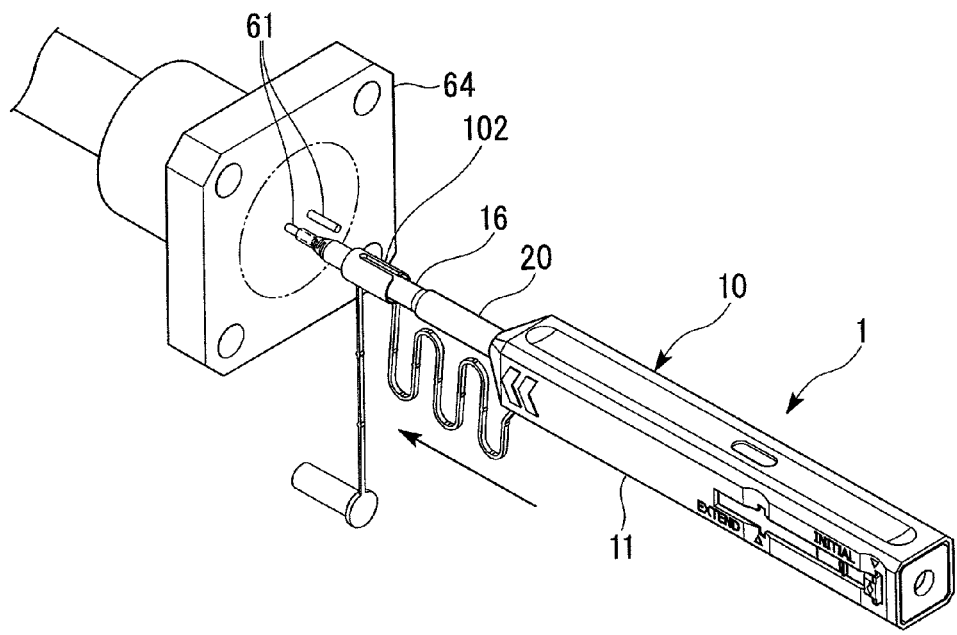
FIG. 20 is a processing diagram following FIG. 19.

As shown in FIGS. 20 and 24, the case body 11 is held. The ferrule 61 is inserted to the insertion hole 116 of the guiding body 107 of the guiding part 102 from the tip side.

As shown in FIG. 24, the guiding body 107 is inserted until the tip of the tip tube part 115 hits one side 64a of the substrate 64 of the optical connector 60.

Figure 21:
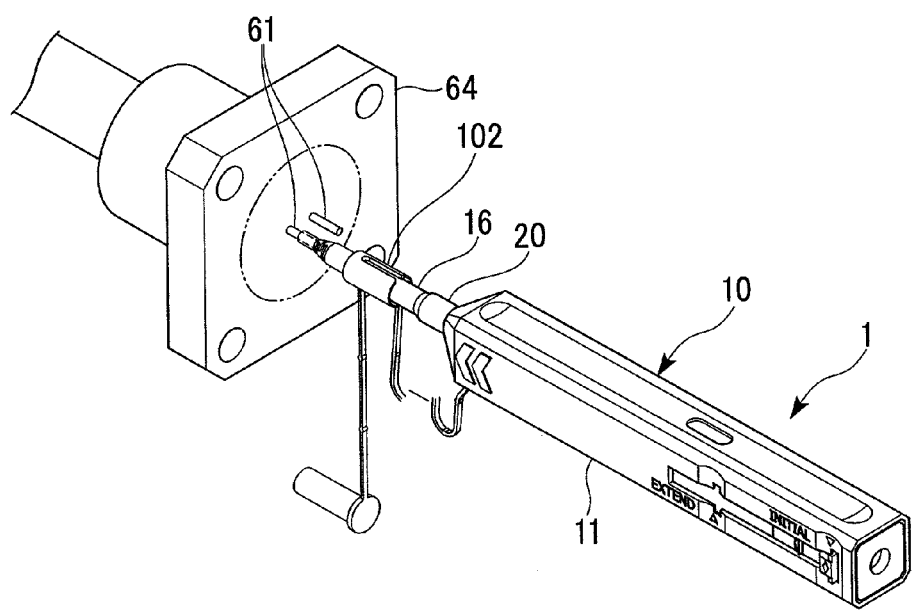
FIG. 21 is a processing diagram following FIG. 20.
Figure 25:
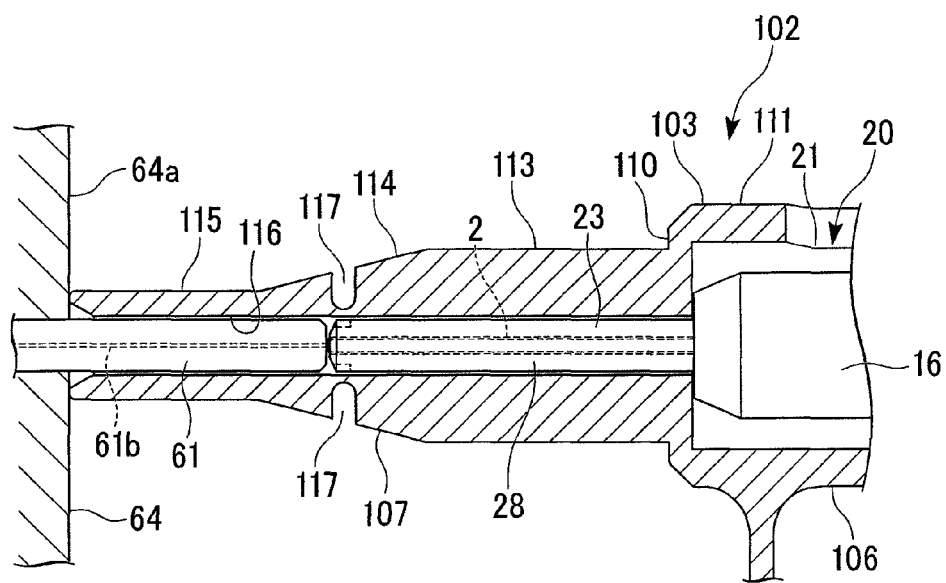
FIG. 25 is a descriptive view representing a movement of a head part according to the above embodiment.

As shown in FIGS. 21 and 25, when the case body 11 is moved towards the front, the tip tube part 16 receives a reactive force from the side 64a. As a result, the tip tube part 16 moves relatively backwards. This position of the tip tube part is referred to as the rear position.

Figure 18:
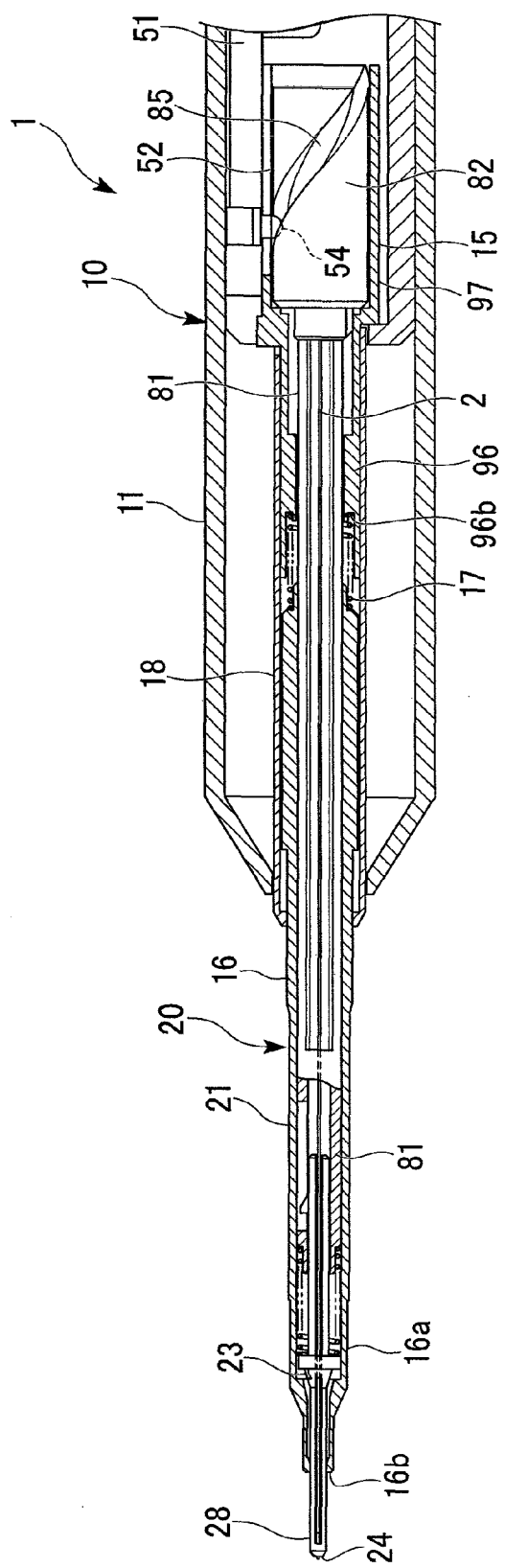
FIG. 18 is a descriptive view representing a movement of a head part according to the above embodiment.
Figure 23:
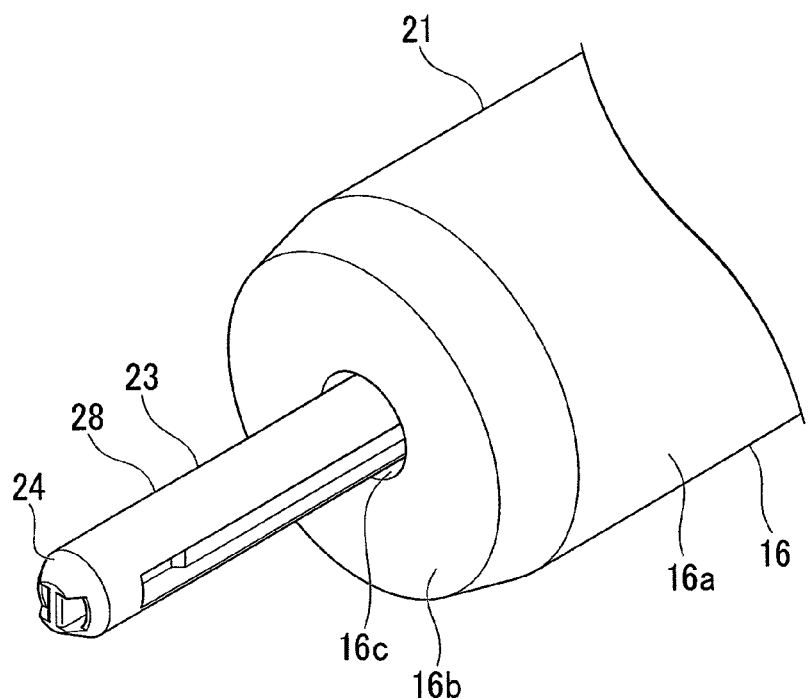
FIG. 23 is a perspective view providing an enlarged view of a relevant component of a cleaning device according to the above embodiment.

As shown in FIGS. 18 and 23, when the tip tube part 16 is located at the rear position, a large portion of the tip extending part 28 extends from the tip tube part 16.

As shown in FIGS. 25 and 26, the tip extending part 28 moves inside the insertion hole 116. In addition, the cleaning body 2 on the pressing surface 24 contacts an appropriate place of the connecting terminal surface 61a of the ferrule 61 (here, referring to the optical fiber hole 61b and its vicinity).

Figure 27:
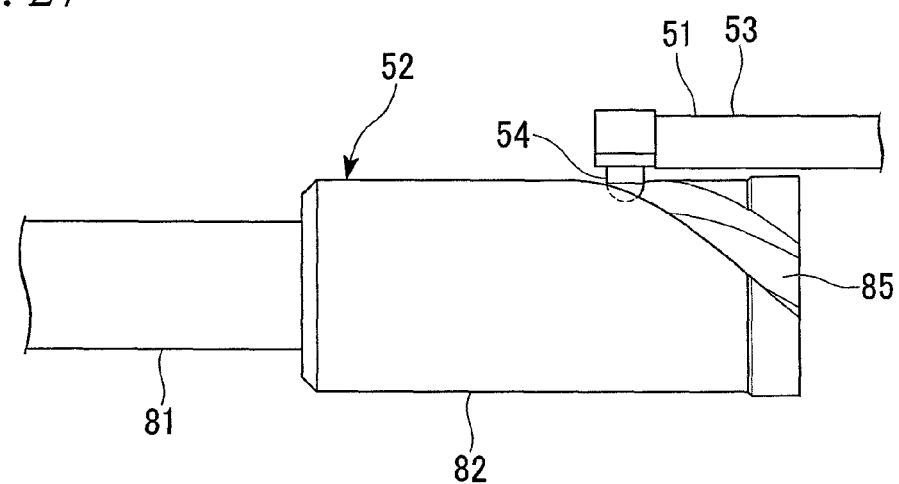
FIG. 27 is a descriptive view representing a movement of a rotational shaft according to the above embodiment.
Figure 28:
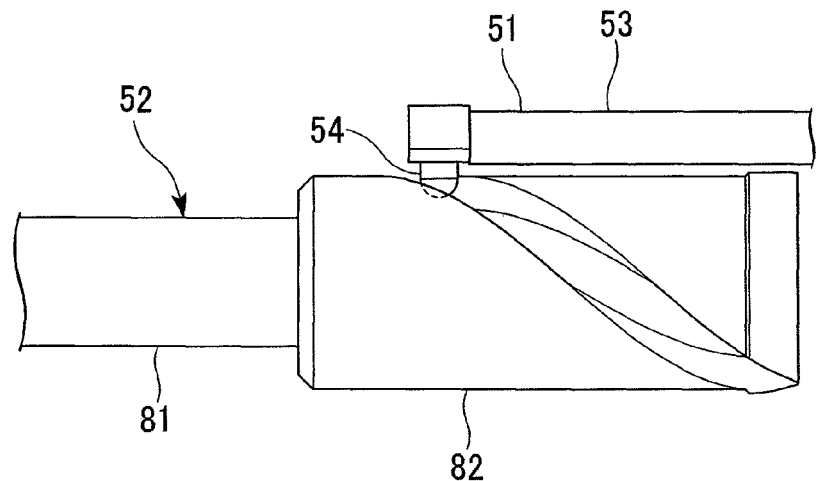
FIG. 28 is a descriptive view representing a movement of a rotational shaft according to the above embodiment.

As shown in FIGS. 27 and 28, the extending tube body 21 moves relatively towards the rear side with respect to the case body 11. Thus, the extending tube body 21 pushes the rotational shaft 52. The rotational shaft 52 then moves relatively towards the rear side with respect to the supporting body 51.

As a result, the rotational tube part 82 moves towards the peripheral direction along the cam groove 85. The rotational shaft 52 then rotates around the axis.

As shown in FIG. 26, the head part 23 rotates around the axis due to the rotation of the rotational shaft 52. As a result, the cleaning body 2 rotates around the axis of the head part 23 while the cleaning body 2 is in contact with the connecting terminal surface 61a. In this way, the connecting terminal surface 61a is cleaned by being wiped by the cleaning body 2.

As shown in FIGS. 4, 7, and 16, the supporting body 51 moves relatively with respect to the feeding mechanism 3. Thus, the gear receiving part 56 applies a force to the gear wheel part 88 of the gear 38 in the rotational direction. As the gear 38 rotates, the wrapping-up reel 31 rotates as well. In this way, the cleaning body 2 is wrapped up.

At the same time, the cleaning body 2 is pulled out from the supplying reel 30 and moves through the pressing surface 24 of the head part 23.

Due to the movement of the cleaning body 2, the litter, dust, and oil attached to the connecting terminal surface 61a is wiped away and removed reliably.

When the extending part 20 is pulled out from the optical connector 60, the extending part 20 moves relatively towards the front with respect to the case body 11 due to the elastic force of the urging member 40 (i.e., in the direction in which the extending part 20 is elongated). At this time, the tip tube part 16 returns to the front position due to the elastic force of the tube urging member 17 (see FIG. 17).

Figure 29:
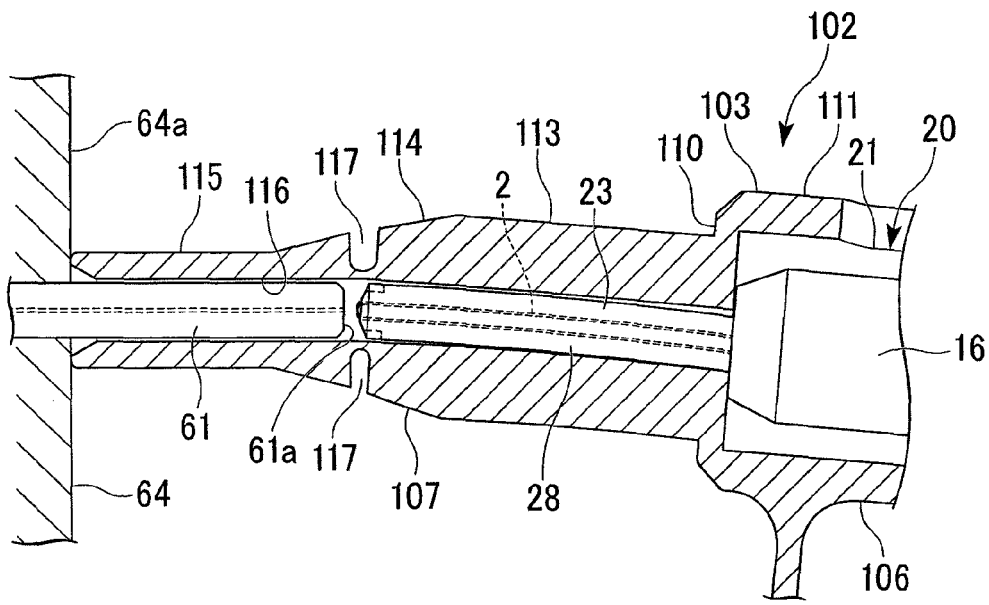
FIG. 29 is a descriptive view representing a movement of a head part according to the above embodiment.

As shown in FIG. 29, when the cleaning operation is being performed, the cleaning device 1 may tilt due to a movement by the cleaning personnel. In the diagramed example, the tip tube part 16 is tilted towards the lower right side.

When the tip tube part 16 is tilted, the guiding part 102 is tilted as well in the same direction. As a result, a force in the bending direction is applied to the ferrule 61. However, since the guiding body 107 of the cleaning device 1 is resilient and can be bent and deformed, the magnitude of the force in the bending direction applied to the ferrule 61 becomes small due to the bending and deforming of the guiding body 107. Consequently, the ferrule 61 is prevented from breaking.

In the diagrammed example, primarily the tapering tube part 114 is bent and deformed. In more detail, a portion of the tapering tube part 114 between the ferrule 61 and the tip extending part 28 is bent significantly. In addition, the base tube part 113 and the tip extending part 28 are slightly bent.

When the guiding part 102 is pulled out from the ferrule 61 after the cleaning operation is completed, the bending of the guiding part 102 is dissolved due to an elastic restoring force. In addition, the bending of the guiding part 28 is dissolved due to the elastic restoring force.

By using the cleaning device 1, the operation of fitting the guiding body 107 of the guiding part 102 into the ferrule 61 becomes easy as well.

In other words, even if the cleaning device 1 is used in a tilting position, the guiding body 107 bends and deforms according to the tilt because the guiding body 107 is flexible. As a result, the insertion operation can be performed easily without applying a large amount of force to the ferrule 61 in the bending direction.

In addition, the tip extending part 28 of the head part 23 of the cleaning device 1 is flexible as well. As a result, the tip extending portion 28 can be deformed according to the bending and deformation of the guiding body 107. As a result, the cleaning operation is not disrupted.

The configuration of the guiding part is not limited to the disclosures of FIGS. 2 and 3. Below, a variation of the guiding part is shown. It should be noted that, in the following description, the configuration already described is referred to using the same reference numeral. Duplicative descriptions are omitted.

Figure 31:
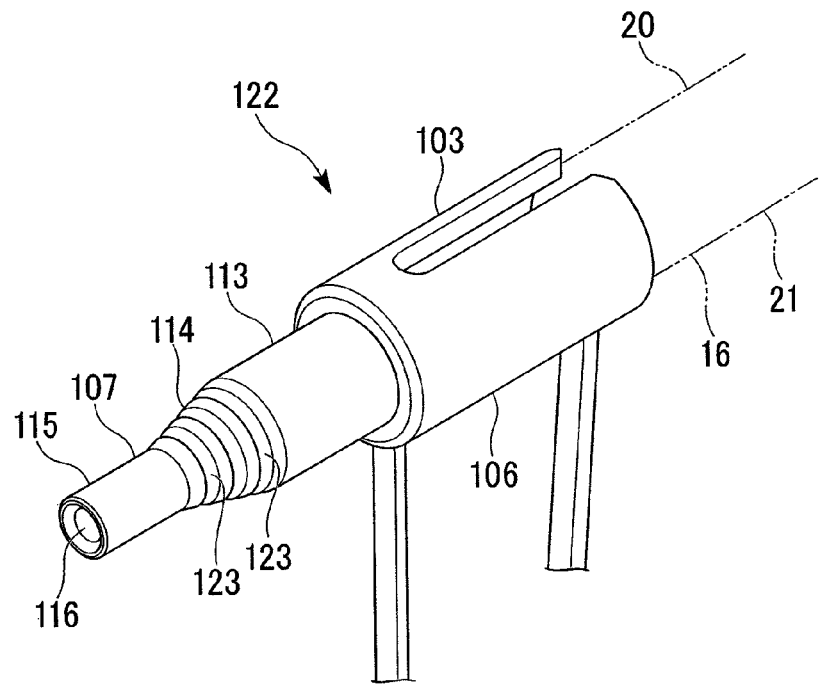
FIG. 31 is a perspective view representing a variation of a guiding part according to the above embodiment.

The guiding part 122 shown in FIG. 31 is different from the guiding part 102 shown in FIG. 2 in that the groove part 117 in FIG. 2 is provided only along a portion of the peripheral direction, whereas the groove part 123 formed on the tapering tube part 114 in FIG. 31 is provided along the entire peripheral direction.

Since the groove part 123 of the guiding part 122 in the present variation is formed along the entire peripheral direction, the tapering tube part 114 can be bent more easily.

Figure 32:
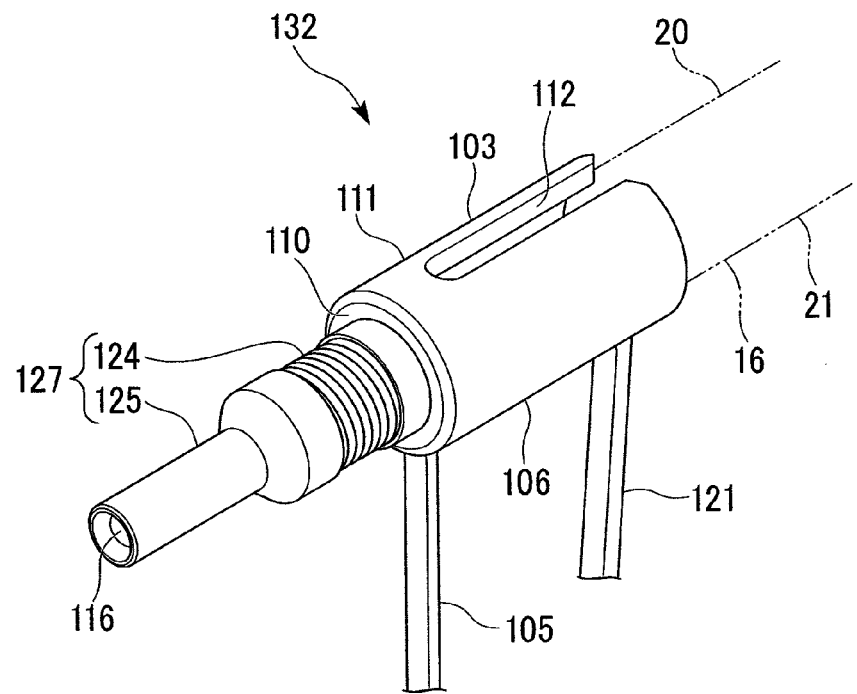
FIG. 32 is a perspective view representing an even further variation of a guiding part according to the above embodiment.

The guiding part 132 shown in FIG. 32 includes the guiding body 127. This guiding body 127 includes a base tube part 124 and a tip tube part 125. The base tube part 124 includes a coil spring which extends from the front surface of the front wall part 110 towards the front side. The tip tube part 125 is made of resin, and extends from the tip of the base tube part 124 towards the front.

The coil spring included in the base tube part 124 can be deformed in the bending direction. However, it is preferred that the coil spring rarely undergo a compressive deformation.

The same type of material used in the tip tube part 115 of the guiding part 102 may also be used in the tip tube part 125.

Since the base tube part 124 includes a coil spring, the guiding part 132 according to the present variation rarely undergoes a local deformation. In addition, the guiding part 132 can be bent adequately. As a result, the positions of the head part 23 and the ferrule 61 can be determined easily.

In addition, the guiding body may be produced using a plurality of different materials. For example, the base tube part and the tapering tube part may be made of a resin material having a higher rigidity compared to the material forming the tip tube part. As a result, the base tube part and the tapering tube part are prevented from being deformed excessively. In addition, the positions of the head part 23 and the ferrule 61 can be determined easily.

Incidentally, according to the diagrammed example, the extending tube body 21 of the extending part 20 includes a tube base part 15 and a tip tube part 16. The length of the protrusion of the tip extending part 28 changes as the tip tube part 16 moves in the front-rear direction. However, the present invention is not limited to this configuration. The extending tube body 21 may be integrally formed, and the tip extending part 28 may be configured to protrude from the tip of the extending tube body 21. In addition, the tip extending part 28, protruding from the extending tube body 21, may be integrally formed on the tip of the extending tube body 21.

In addition, the guiding body 107 of the guiding part 102 may be configured to include only the tapering tube part 114 and the tip tube part 115.

In the diagrammed example, the optical connector 60 was the object to be cleaned. However, the object to be cleaned with the cleaning device according to the present invention is not limited to this diagrammed example. The cleaning device may be used to clean, for example, an optical connector adapter and an optical connector receptacle (in particular, a receptacle housing) as well.

While a preferred embodiment of the present invention has been described above, it should be understood that these are exemplary of the invention and are not to be considered as limiting the present invention. Additions, omissions, substitutions, and other modifications can be made without departing from the spirit or scope of the present invention. The invention is not to be considered as being limited by the foregoing description, and is only limited by the scope of the appended claims.

What is claimed is:

1. An optical connector cleaning device which cleans a connecting terminal surface of a to-be-cleaned object protruding from an optical connector by wiping the connecting terminal surface with a cleaning body, the optical connector cleaning device comprising:
   a main body comprising a feeding mechanism which supplies and wraps up the cleaning body;
   an extending part which extends from the main body; and
   a guiding part attached to a tip portion of the extending part, wherein
   the extending part includes an extending tube body and a tip extending part, the tip extending part pressing the cleaning body to the connecting terminal surface;
   the guiding part includes a fitting part, which is fit to a tip portion of the extending tube body, and a tube-shaped guiding body, which is flexible and extends from the fitting part towards an extending direction in which the extending part is extended;
   an insertion hole is formed, into which the to-be-cleaned object is inserted from a tip side of the guiding body, and, into which the tip extending part is inserted from a rear end side of the guiding body;
   the to-be-cleaned object is cleaned by inserting the to-be-cleaned object into the insertion hole of the guiding part attached to the tip portion of the extending part, and by pressing the cleaning body against the connecting terminal surface of the to-be-cleaned object;
   the guiding body comprises a tapering tube part, a thickness of which decreases while the tapering tube part extends towards the extending direction, and a tip tube part, which has a substantially uniform thickness and extends from a tip of the tapering tube part towards the extending direction; and
   the substantially uniform thickness of the tip tube part is smaller than or equal to a minimum thickness of the tapering tube part.

2. An optical connector cleaning device according to claim 1, further comprising:
   one or more groove parts formed on an outer peripheral surface of the tapering tube part in a direction perpendicular to the extending direction.

3. An optical connector cleaning device according to claim 1, wherein the guiding part is an integrated product comprising resin material.

4. An optical connector cleaning device according to claim 1, wherein the guiding part comprises polyester elastomer.

5. An optical connector cleaning device according to claim 1, wherein the tip extending part is flexible.

6. An optical connector cleaning device according to claim 1, wherein
   the extending tube body comprises a tube base part and a tip tube part, which is energized by an urging member towards the extending direction with respect to the tube base part;
   the tip extending part protrudes from a tip of the tip tube part; and
   the tip tube part adjusts a protrusion length of the tip extending part by moving towards the extending direction with respect to the tube base part.

* * * * *